(12) United States Patent
Li et al.

(10) Patent No.: US 11,272,590 B2
(45) Date of Patent: Mar. 8, 2022

(54) SYSTEMS AND METHODS FOR DIMMING CONTROL RELATED TO TRIAC DIMMERS ASSOCIATED WITH LED LIGHTING

(71) Applicant: ON-BRIGHT ELECTRONICS (SHANGHAI) CO., LTD., Shanghai (CN)

(72) Inventors: Ke Li, Shanghai (CN); Zhuoyan Li, Shanghai (CN); Liqiang Zhu, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 17/074,303

(22) Filed: Oct. 19, 2020

(65) Prior Publication Data
US 2021/0153313 A1    May 20, 2021

(30) Foreign Application Priority Data
Nov. 20, 2019 (CN) .......................... 201911140844.5

(51) Int. Cl.
*H05B 45/39*    (2020.01)
*H05B 45/14*    (2020.01)
(Continued)

(52) U.S. Cl.
CPC ........... *H05B 45/14* (2020.01); *H05B 45/345* (2020.01); *H05B 45/39* (2020.01); *H05B 47/165* (2020.01)

(58) Field of Classification Search
CPC ........ H05B 45/37; H05B 45/44; H05B 45/46; H05B 45/50; H05B 45/395
See application file for complete search history.

(56) References Cited

U.S. PATENT DOCUMENTS 3,803,452 A    4/1974   Goldschmied
3,899,713 A    8/1975   Barkan et al.
(Continued)

FOREIGN PATENT DOCUMENTS

CN    1448005 A    10/2003
CN    101040570 A    9/2007
(Continued)

OTHER PUBLICATIONS

China Patent Office, Office Action dated Aug. 28, 2015, in Application No. 201410322602.9.
(Continued)

*Primary Examiner* — Tung X Le
(74) *Attorney, Agent, or Firm* — Faegre Drinker Biddle & Reath LLP

(57) ABSTRACT

System and method for controlling one or more light emitting diodes. For example, the system includes: a voltage detector configured to receive a rectified voltage associated with a TRIAC dimmer and generated by a rectifying bridge and generate a first sensing signal representing the rectified voltage; a distortion detector configured to receive the first sensing signal, determine whether the rectified voltage is distorted or not based at least in part on the first sensing signal, and generate a distortion detection signal indicating whether the rectified voltage is distorted or not; and a phase detector configured to receive the first sensing signal and generate a phase detection signal indicating a detected phase range within which the TRIAC dimmer is in a conduction state based at least in part on the first sensing signal.

26 Claims, 10 Drawing Sheets

(51) Int. Cl.
  *H05B 47/165* (2020.01)
  *H05B 45/345* (2020.01)

(56) References Cited

U.S. PATENT DOCUMENTS

| | | | |
|---|---|---|---|
| 4,253,045 A | 2/1981 | Weber | |
| 5,144,205 A | 9/1992 | Motto et al. | |
| 5,249,298 A | 9/1993 | Bolan et al. | |
| 5,504,398 A | 4/1996 | Rothenbuhler | |
| 5,949,197 A | 9/1999 | Kastner | |
| 6,196,208 B1 | 3/2001 | Masters | |
| 6,218,788 B1 | 4/2001 | Chen et al. | |
| 6,229,271 B1 | 5/2001 | Liu | |
| 6,278,245 B1 | 8/2001 | Li et al. | |
| 7,038,399 B2 | 5/2006 | Lys et al. | |
| 7,649,327 B2 | 1/2010 | Peng | |
| 7,759,881 B1 | 7/2010 | Melanson | |
| 7,825,715 B1 | 11/2010 | Greenberg | |
| 7,880,400 B2 | 2/2011 | Zhou et al. | |
| 7,944,153 B2 | 5/2011 | Greenfeld | |
| 8,018,171 B1 | 9/2011 | Melanson et al. | |
| 8,129,976 B2 | 3/2012 | Blakeley | |
| 8,134,302 B2 | 3/2012 | Yang et al. | |
| 8,278,832 B2 | 10/2012 | Hung et al. | |
| 8,373,313 B2 | 2/2013 | Garcia et al. | |
| 8,378,583 B2 | 2/2013 | Hying et al. | |
| 8,378,588 B2 | 2/2013 | Kuo et al. | |
| 8,378,589 B2 | 2/2013 | Kuo et al. | |
| 8,415,901 B2 | 4/2013 | Recker et al. | |
| 8,432,438 B2 | 4/2013 | Ryan et al. | |
| 8,497,637 B2 | 7/2013 | Liu | |
| 8,558,477 B2 | 10/2013 | Bordin et al. | |
| 8,569,956 B2 | 10/2013 | Shteynberg et al. | |
| 8,644,041 B2 | 2/2014 | Pansier | |
| 8,653,750 B2 | 2/2014 | Deurenberg et al. | |
| 8,686,668 B2 | 4/2014 | Grotkowski et al. | |
| 8,698,419 B2 | 4/2014 | Yan et al. | |
| 8,716,882 B2 | 5/2014 | Pettler et al. | |
| 8,742,674 B2 | 6/2014 | Shteynberg et al. | |
| 8,829,819 B1 | 9/2014 | Angeles et al. | |
| 8,890,440 B2 | 11/2014 | Yan et al. | |
| 8,896,288 B2 | 11/2014 | Choi et al. | |
| 8,941,324 B2 | 1/2015 | Zhou | |
| 8,941,328 B2 | 1/2015 | Wu et al. | |
| 8,947,010 B2 | 2/2015 | Barrow | |
| 9,030,122 B2 | 5/2015 | Yan | |
| 9,084,316 B2 | 7/2015 | Melanson et al. | |
| 9,131,581 B1 | 9/2015 | Hsia et al. | |
| 9,148,050 B2 | 9/2015 | Chiang | |
| 9,167,638 B2 | 10/2015 | Le | |
| 9,173,258 B2 | 10/2015 | Ekbote | |
| 9,207,265 B1 | 12/2015 | Grisamore | |
| 9,220,133 B2 | 12/2015 | Salvestrini et al. | |
| 9,220,136 B2 | 12/2015 | Zhang | |
| 9,247,623 B2 | 1/2016 | Recker et al. | |
| 9,247,625 B2 | 1/2016 | Recker et al. | |
| 9,301,349 B2 | 3/2016 | Zhu et al. | |
| 9,332,609 B1 | 5/2016 | Rhodes et al. | |
| 9,402,293 B2 | 7/2016 | Vaughan et al. | |
| 9,408,269 B2 | 8/2016 | Zhu et al. | |
| 9,414,455 B2 | 8/2016 | Zhou et al. | |
| 9,467,137 B2 | 10/2016 | Eum et al. | |
| 9,480,118 B2 | 10/2016 | Liao et al. | |
| 9,485,833 B2 | 11/2016 | Datta et al. | |
| 9,554,432 B2 | 1/2017 | Zhu et al. | |
| 9,572,224 B2 | 2/2017 | Gaknoki et al. | |
| 9,585,222 B2 | 2/2017 | Zhu et al. | |
| 9,655,188 B1 | 5/2017 | Lewis et al. | |
| 9,661,702 B2 | 5/2017 | Mednik et al. | |
| 9,723,676 B2 | 8/2017 | Ganick et al. | |
| 9,750,107 B2 | 8/2017 | Zhu et al. | |
| 9,781,786 B2 | 10/2017 | Ho et al. | |
| 9,820,344 B1 | 11/2017 | Papanicolaou | |
| 9,883,561 B1 | 1/2018 | Liang et al. | |
| 9,883,562 B2 | 1/2018 | Zhu et al. | |
| 9,961,734 B2 | 6/2018 | Zhu et al. | |
| 10,054,271 B2 | 8/2018 | Xiong et al. | |
| 10,153,684 B2 | 12/2018 | Liu et al. | |
| 10,194,500 B2 | 1/2019 | Zhu et al. | |
| 10,264,642 B2 | 4/2019 | Liang et al. | |
| 10,292,217 B2 | 5/2019 | Zhu et al. | |
| 10,299,328 B2 | 5/2019 | Fu et al. | |
| 10,334,677 B2 | 6/2019 | Zhu et al. | |
| 10,342,087 B2 | 7/2019 | Zhu et al. | |
| 10,362,643 B2 | 7/2019 | Kim et al. | |
| 10,375,785 B2 | 8/2019 | Li et al. | |
| 10,383,187 B2 | 8/2019 | Liao et al. | |
| 10,447,171 B2 | 10/2019 | Newman, Jr. et al. | |
| 10,448,469 B2 | 10/2019 | Zhu et al. | |
| 10,448,470 B2 | 10/2019 | Zhu et al. | |
| 10,455,657 B2 | 10/2019 | Zhu et al. | |
| 10,512,131 B2 | 12/2019 | Zhu et al. | |
| 10,568,185 B1 | 2/2020 | Ostrovsky et al. | |
| 10,616,975 B2 | 4/2020 | Gotou et al. | |
| 10,687,397 B2 | 6/2020 | Zhu et al. | |
| 10,530,268 B2 | 9/2020 | Newman, Jr. et al. | |
| 10,785,837 B2 | 9/2020 | Li et al. | |
| 10,827,588 B2 | 11/2020 | Zhu et al. | |
| 10,973,095 B2 | 4/2021 | Zhu et al. | |
| 10,999,903 B2 | 5/2021 | Li et al. | |
| 10,999,904 B2 | 5/2021 | Zhu et al. | |
| 11,026,304 B2 | 6/2021 | Li et al. | |
| 2006/0022648 A1 | 2/2006 | Ben-Yaakov et al. | |
| 2007/0182338 A1 | 8/2007 | Shteynberg | |
| 2007/0182699 A1 | 8/2007 | Ha et al. | |
| 2007/0267978 A1 | 11/2007 | Shteynberg et al. | |
| 2008/0224629 A1 | 9/2008 | Melanson | |
| 2008/0224633 A1 | 9/2008 | Melanson et al. | |
| 2008/0278092 A1 | 11/2008 | Lys et al. | |
| 2009/0021469 A1 | 1/2009 | Yeo et al. | |
| 2009/0085494 A1 | 4/2009 | Summerland | |
| 2009/0251059 A1 | 10/2009 | Veltman | |
| 2010/0141153 A1 | 6/2010 | Recker et al. | |
| 2010/0148691 A1 | 6/2010 | Kuo et al. | |
| 2010/0156319 A1* | 6/2010 | Melanson | H05B 45/20 315/297 |
| 2010/0164406 A1 | 7/2010 | Kost et al. | |
| 2010/0176733 A1 | 7/2010 | King | |
| 2010/0207536 A1 | 8/2010 | Burdalski | |
| 2010/0213859 A1 | 8/2010 | Shteynberg | |
| 2010/0219766 A1 | 9/2010 | Kuo et al. | |
| 2010/0231136 A1 | 9/2010 | Reisenauer et al. | |
| 2011/0012530 A1 | 1/2011 | Zheng et al. | |
| 2011/0037399 A1 | 2/2011 | Hung et al. | |
| 2011/0074302 A1 | 3/2011 | Draper et al. | |
| 2011/0080110 A1 | 4/2011 | Nuhfer et al. | |
| 2011/0080111 A1 | 4/2011 | Nuhfer et al. | |
| 2011/0101867 A1 | 5/2011 | Wang et al. | |
| 2011/0121744 A1 | 5/2011 | Salvestrini | |
| 2011/0121754 A1 | 5/2011 | Shteynberg | |
| 2011/0133662 A1 | 6/2011 | Yan et al. | |
| 2011/0140620 A1 | 6/2011 | Lin et al. | |
| 2011/0140621 A1 | 6/2011 | Yi et al. | |
| 2011/0187283 A1 | 8/2011 | Wang et al. | |
| 2011/0227490 A1 | 9/2011 | Huynh | |
| 2011/0260619 A1 | 10/2011 | Sadwick | |
| 2011/0285301 A1 | 11/2011 | Kuang et al. | |
| 2011/0291583 A1 | 12/2011 | Shen | |
| 2011/0309759 A1 | 12/2011 | Shteynberg | |
| 2012/0001548 A1 | 1/2012 | Recker et al. | |
| 2012/0032604 A1 | 2/2012 | Hontele | |
| 2012/0056553 A1 | 3/2012 | Koolen et al. | |
| 2012/0069616 A1 | 3/2012 | Kitamura et al. | |
| 2012/0080944 A1 | 4/2012 | Recker et al. | |
| 2012/0081009 A1 | 4/2012 | Shteynberg et al. | |
| 2012/0081032 A1 | 4/2012 | Huang | |
| 2012/0146526 A1 | 6/2012 | Lam et al. | |
| 2012/0181944 A1 | 7/2012 | Jacobs et al. | |
| 2012/0181946 A1 | 7/2012 | Melanson | |
| 2012/0187857 A1 | 7/2012 | Ulmann et al. | |
| 2012/0242237 A1 | 9/2012 | Chen et al. | |
| 2012/0262093 A1 | 10/2012 | Recker et al. | |
| 2012/0268031 A1 | 10/2012 | Zhou et al. | |
| 2012/0274227 A1 | 11/2012 | Zheng et al. | |

(56) References Cited

U.S. PATENT DOCUMENTS

| | | |
|---|---|---|
| 2012/0286679 A1 | 11/2012 | Liu |
| 2012/0299500 A1 | 11/2012 | Sadwick |
| 2012/0299501 A1 | 11/2012 | Kost et al. |
| 2012/0299511 A1 | 11/2012 | Montante et al. |
| 2012/0319604 A1* | 12/2012 | Walters ............... H05B 45/327 315/200 R |
| 2012/0326616 A1 | 12/2012 | Sumitani et al. |
| 2013/0009561 A1 | 1/2013 | Briggs |
| 2013/0020965 A1 | 1/2013 | Kang et al. |
| 2013/0026942 A1 | 1/2013 | Ryan et al. |
| 2013/0026945 A1 | 1/2013 | Ganick et al. |
| 2013/0027528 A1 | 1/2013 | Staats et al. |
| 2013/0034172 A1 | 2/2013 | Pettler et al. |
| 2013/0043726 A1 | 2/2013 | Krishnamoorthy et al. |
| 2013/0049631 A1 | 2/2013 | Riesebosch |
| 2013/0063047 A1 | 3/2013 | Veskovic |
| 2013/0141001 A1 | 6/2013 | Datta et al. |
| 2013/0154487 A1 | 6/2013 | Kuang et al. |
| 2013/0162158 A1 | 6/2013 | Pollischansky |
| 2013/0175931 A1 | 7/2013 | Sadwick |
| 2013/0181630 A1 | 7/2013 | Taipale et al. |
| 2013/0193866 A1 | 8/2013 | Datta et al. |
| 2013/0193879 A1 | 8/2013 | Sadwick |
| 2013/0194848 A1 | 8/2013 | Bemardinis et al. |
| 2013/0215655 A1* | 8/2013 | Yang ..................... H05B 45/10 363/89 |
| 2013/0223107 A1 | 8/2013 | Zhang et al. |
| 2013/0229121 A1 | 9/2013 | Otake et al. |
| 2013/0241427 A1 | 9/2013 | Kesterson et al. |
| 2013/0241428 A1 | 9/2013 | Takeda |
| 2013/0241441 A1 | 9/2013 | Myers et al. |
| 2013/0242622 A1 | 9/2013 | Peng |
| 2013/0249431 A1 | 9/2013 | Shteynberg et al. |
| 2013/0278159 A1* | 10/2013 | Del Carmen, Jr. .......................... H05B 45/3575 315/200 R |
| 2013/0307430 A1 | 11/2013 | Blom |
| 2013/0307431 A1 | 11/2013 | Zhu et al. |
| 2013/0307434 A1 | 11/2013 | Zhang |
| 2013/0342127 A1 | 12/2013 | Pan et al. |
| 2014/0009082 A1 | 1/2014 | King et al. |
| 2014/0029315 A1 | 1/2014 | Zhang et al. |
| 2014/0049177 A1 | 2/2014 | Kulczycki et al. |
| 2014/0063857 A1 | 3/2014 | Peng |
| 2014/0078790 A1 | 3/2014 | Lin et al. |
| 2014/0103829 A1 | 4/2014 | Kang |
| 2014/0132172 A1 | 5/2014 | Zhu et al. |
| 2014/0160809 A1 | 6/2014 | Lin et al. |
| 2014/0176016 A1 | 6/2014 | Li et al. |
| 2014/0177280 A1 | 6/2014 | Yang et al. |
| 2014/0197760 A1 | 7/2014 | Radermacher |
| 2014/0265898 A1 | 9/2014 | Del Carmen, Jr. et al. |
| 2014/0265907 A1 | 9/2014 | Su et al. |
| 2014/0265935 A1 | 9/2014 | Sadwick |
| 2014/0268935 A1 | 9/2014 | Chiang |
| 2014/0300274 A1 | 10/2014 | Acatrinei |
| 2014/0320031 A1 | 10/2014 | Wu et al. |
| 2014/0333228 A1* | 11/2014 | Angeles ............. H05B 45/3575 315/291 |
| 2014/0346973 A1 | 11/2014 | Zhu et al. |
| 2014/0354157 A1 | 12/2014 | Morales |
| 2014/0354165 A1 | 12/2014 | Malyna et al. |
| 2014/0354170 A1 | 12/2014 | Gredler |
| 2015/0015159 A1 | 1/2015 | Wang et al. |
| 2015/0035450 A1 | 2/2015 | Werner |
| 2015/0048757 A1 | 2/2015 | Boonen et al. |
| 2015/0062981 A1 | 3/2015 | Fang |
| 2015/0077009 A1 | 3/2015 | Kunimatsu |
| 2015/0091470 A1 | 4/2015 | Zhou et al. |
| 2015/0137704 A1 | 5/2015 | Angeles et al. |
| 2015/0312978 A1 | 10/2015 | Vaughan et al. |
| 2015/0312982 A1 | 10/2015 | Melanson |
| 2015/0312988 A1 | 10/2015 | Liao et al. |
| 2015/0318789 A1 | 11/2015 | Yang et al. |
| 2015/0333764 A1 | 11/2015 | Pastore et al. |
| 2015/0357910 A1 | 12/2015 | Murakami et al. |
| 2015/0359054 A1 | 12/2015 | Lin et al. |
| 2015/0366010 A1 | 12/2015 | Mao et al. |
| 2015/0382424 A1 | 12/2015 | Knapp et al. |
| 2016/0014861 A1 | 1/2016 | Zhu et al. |
| 2016/0014865 A1 | 1/2016 | Zhu et al. |
| 2016/0037604 A1 | 2/2016 | Zhu et al. |
| 2016/0119998 A1 | 4/2016 | Linnartz et al. |
| 2016/0277411 A1 | 9/2016 | Dani et al. |
| 2016/0286617 A1 | 9/2016 | Takahashi et al. |
| 2016/0323957 A1* | 11/2016 | Hu ........................ H05B 45/18 |
| 2016/0338163 A1 | 11/2016 | Zhu et al. |
| 2017/0006684 A1 | 1/2017 | Tu et al. |
| 2017/0027029 A1* | 1/2017 | Hu ........................ H05B 45/14 |
| 2017/0064787 A1 | 3/2017 | Liao et al. |
| 2017/0099712 A1 | 4/2017 | Hilgers et al. |
| 2017/0181235 A1 | 6/2017 | Zhu et al. |
| 2017/0196063 A1 | 7/2017 | Zhu et al. |
| 2017/0251532 A1 | 8/2017 | Wang et al. |
| 2017/0311409 A1 | 10/2017 | Zhu et al. |
| 2017/0354008 A1 | 12/2017 | Eum et al. |
| 2017/0359880 A1 | 12/2017 | Zhu et al. |
| 2018/0103520 A1 | 4/2018 | Zhu et al. |
| 2018/0110104 A1 | 4/2018 | Liang et al. |
| 2018/0115234 A1 | 4/2018 | Liu et al. |
| 2018/0139816 A1 | 5/2018 | Liu et al. |
| 2018/0288845 A1 | 10/2018 | Zhu et al. |
| 2019/0069364 A1 | 2/2019 | Zhu et al. |
| 2019/0069366 A1 | 2/2019 | Liao et al. |
| 2019/0082507 A1 | 3/2019 | Zhu et al. |
| 2019/0124736 A1 | 4/2019 | Zhu et al. |
| 2019/0166667 A1 | 5/2019 | Li et al. |
| 2019/0230755 A1 | 7/2019 | Zhu et al. |
| 2019/0327810 A1 | 10/2019 | Zhu et al. |
| 2019/0350060 A1 | 11/2019 | Li et al. |
| 2019/0380183 A1 | 12/2019 | Li et al. |
| 2020/0100340 A1 | 3/2020 | Zhu et al. |
| 2020/0146121 A1 | 5/2020 | Zhu et al. |
| 2020/0205263 A1 | 6/2020 | Zhu et al. |
| 2020/0205264 A1 | 6/2020 | Zhu et al. |
| 2020/0267817 A1 | 8/2020 | Yang et al. |
| 2020/0305247 A1 | 9/2020 | Li et al. |
| 2020/0375001 A1 | 11/2020 | Jung et al. |
| 2021/0007195 A1 | 1/2021 | Zhu et al. |
| 2021/0007196 A1 | 1/2021 | Zhu et al. |
| 2021/0045213 A1 | 2/2021 | Zhu et al. |
| 2021/0195709 A1 | 6/2021 | Li et al. |
| 2021/0204375 A1 | 7/2021 | Li et al. |

FOREIGN PATENT DOCUMENTS

| | | |
|---|---|---|
| CN | 101657057 A | 2/2010 |
| CN | 101868090 | 10/2010 |
| CN | 101896022 A | 11/2010 |
| CN | 101917804 A | 12/2010 |
| CN | 101938865 A | 1/2011 |
| CN | 101998734 A | 3/2011 |
| CN | 102014540 | 4/2011 |
| CN | 102014551 A | 4/2011 |
| CN | 102056378 A | 5/2011 |
| CN | 102209412 A | 10/2011 |
| CN | 102300375 A | 12/2011 |
| CN | 102347607 | 2/2012 |
| CN | 102387634 A | 3/2012 |
| CN | 103004290 | 3/2012 |
| CN | 102474953 | 5/2012 |
| CN | 102497706 | 6/2012 |
| CN | 102612194 A | 7/2012 |
| CN | 202353859 U | 7/2012 |
| CN | 102668717 A | 9/2012 |
| CN | 102695330 A | 9/2012 |
| CN | 102791056 A | 11/2012 |
| CN | 102843836 A | 12/2012 |
| CN | 202632722 U | 12/2012 |
| CN | 102870497 | 1/2013 |
| CN | 102946674 A | 2/2013 |
| CN | 103024994 A | 4/2013 |
| CN | 103096606 A | 5/2013 |

(56) References Cited

FOREIGN PATENT DOCUMENTS

| | | |
|---|---|---|
| CN | 103108470 A | 5/2013 |
| CN | 103260302 A | 8/2013 |
| CN | 103313472 | 9/2013 |
| CN | 103369802 A | 10/2013 |
| CN | 103379712 A | 10/2013 |
| CN | 103428953 A | 12/2013 |
| CN | 103458579 A | 12/2013 |
| CN | 103547014 | 1/2014 |
| CN | 103716934 | 4/2014 |
| CN | 103858524 | 6/2014 |
| CN | 203675408 U | 6/2014 |
| CN | 103945614 A | 7/2014 |
| CN | 103957634 A | 7/2014 |
| CN | 102612194 B | 8/2014 |
| CN | 104066254 | 9/2014 |
| CN | 103096606 B | 12/2014 |
| CN | 204392621 U | 6/2015 |
| CN | 103648219 B | 7/2015 |
| CN | 104768265 A | 7/2015 |
| CN | 103781229 B | 9/2015 |
| CN | 105246218 A | 1/2016 |
| CN | 105265019 | 1/2016 |
| CN | 105423140 A | 3/2016 |
| CN | 105591553 A | 5/2016 |
| CN | 105873269 | 8/2016 |
| CN | 105992440 A | 10/2016 |
| CN | 106105395 A | 11/2016 |
| CN | 106163009 A | 11/2016 |
| CN | 205812458 U | 12/2016 |
| CN | 106358337 A | 1/2017 |
| CN | 106413189 | 2/2017 |
| CN | 206042434 U | 3/2017 |
| CN | 106604460 A | 4/2017 |
| CN | 106793246 A | 5/2017 |
| CN | 106888524 A | 6/2017 |
| CN | 107046751 A | 8/2017 |
| CN | 107069726 A | 8/2017 |
| CN | 106332374 A | 11/2017 |
| CN | 106888524 B | 1/2018 |
| CN | 106912144 B | 1/2018 |
| CN | 107645804 A | 1/2018 |
| CN | 104902653 B | 4/2018 |
| CN | 107995750 A | 5/2018 |
| CN | 207460551 U | 6/2018 |
| CN | 108337764 A | 7/2018 |
| CN | 108366460 A | 8/2018 |
| CN | 207744191 U | 8/2018 |
| CN | 207910676 U | 9/2018 |
| CN | 108834259 A | 11/2018 |
| CN | 109246885 A | 1/2019 |
| CN | 208572500 U | 3/2019 |
| CN | 109729621 A | 5/2019 |
| CN | 110086362 A | 8/2019 |
| CN | 107995747 B | 11/2019 |
| CN | 110493913 A | 11/2019 |
| EP | 2403318 A1 | 1/2012 |
| EP | 2938164 A2 | 10/2015 |
| EP | 2590477 B1 | 4/2018 |
| JP | 2008-010152 A | 1/2008 |
| JP | 2011-249328 A | 12/2011 |
| TW | 201215228 A1 | 9/2010 |
| TW | 201125441 A | 7/2011 |
| TW | 201132241 | 9/2011 |
| TW | 201143501 A1 | 12/2011 |
| TW | 201143530 A | 12/2011 |
| TW | 201146087 A1 | 12/2011 |
| TW | 201204168 A1 | 1/2012 |
| TW | 201208463 A1 | 2/2012 |
| TW | 201208481 A1 | 2/2012 |
| TW | 201208486 | 2/2012 |
| TW | 201233021 A | 8/2012 |
| TW | 201244543 | 11/2012 |
| TW | I-387396 | 2/2013 |
| TW | 201315118 A | 4/2013 |
| TW | 201322825 A | 6/2013 |
| TW | 201336345 A1 | 9/2013 |
| TW | 201342987 | 10/2013 |
| TW | 201348909 | 12/2013 |
| TW | I-422130 | 1/2014 |
| TW | I-423732 | 1/2014 |
| TW | 201412189 A | 3/2014 |
| TW | 201414146 A | 4/2014 |
| TW | I-434616 | 4/2014 |
| TW | M-477115 | 4/2014 |
| TW | 201417626 A | 5/2014 |
| TW | 201417631 | 5/2014 |
| TW | 201422045 | 6/2014 |
| TW | 201424454 A | 6/2014 |
| TW | I-441428 | 6/2014 |
| TW | I-448198 | 8/2014 |
| TW | 201503756 A | 1/2015 |
| TW | 201515514 | 4/2015 |
| TW | I-496502 B | 8/2015 |
| TW | 201603644 | 1/2016 |
| TW | 201607368 | 2/2016 |
| TW | I-524814 | 3/2016 |
| TW | I-535175 | 5/2016 |
| TW | I-540809 B | 7/2016 |
| TW | 201630468 A | 8/2016 |
| TW | 201639415 A | 11/2016 |
| TW | I-630842 | 7/2018 |
| TW | 201909699 A | 3/2019 |
| TW | 201927074 A | 7/2019 |

OTHER PUBLICATIONS

China Patent Office, Office Action dated Aug. 8, 2015, in Application No. 201410172086.6.
China Patent Office, Office Action dated Mar. 2, 2016, in Application No. 201410172086.6.
China Patent Office, Office Action dated Dec. 14, 2015, in Application No. 201210166672.0.
China Patent Office, Office Action dated Sep. 2, 2016, in Application No. 201510103579.9.
China Patent Office, Office Action dated Jul. 7, 2014, in Application No. 201210468505.1.
China Patent Office, Office Action dated Jun. 3, 2014, in Application No. 201110103130.4.
China Patent Office, Office Action dated Jun. 30, 2015, in Application No. 201410171893.6.
China Patent Office, Office Action dated Nov. 15, 2014, in Application No. 201210166672.0.
China Patent Office, Office Action dated Oct. 19, 2015, in Application No. 201410322612.2.
China Patent Office, Office Action dated Mar. 22, 2016, in Application No. 201410322612.2.
China Patent Office, Office Action dated Nov. 29, 2018, in Application No. 201710828263.5.
China Patent Office, Office Action dated Dec. 3, 2018, in Application No. 201710557179.4.
China Patent Office, Office Action dated Mar. 22, 2019, in Application No. 201711464007.9.
China Patent Office, Office Action dated Jan. 9, 2020, in Application No. 201710828263.5.
China Patent Office, Office Action dated Nov. 2, 2020, in Application No. 201910124049.0.
Taiwan Intellectual Property Office, Office Action dated Jan. 7, 2014, in Application No. 100119272.
Taiwan Intellectual Property Office, Office Action dated Jun. 9, 2014, in Application No. 101124982.
Taiwan Intellectual Property Office, Office Action dated Nov. 13, 2015, in Application No. 103141628.
Taiwan Intellectual Property Office, Office Action dated Sep. 17, 2015, in Application No. 103127108.
Taiwan Intellectual Property Office, Office Action dated Sep. 17, 2015, in Application No. 103127620.
Taiwan Intellectual Property Office, Office Action dated Sep. 25, 2014, in Application No. 101148716.

(56) References Cited

OTHER PUBLICATIONS

Taiwan Intellectual Property Office, Office Action dated Feb. 27, 2018, in Application No. 106136242.
Taiwan Intellectual Property Office, Office Action dated Jan. 14, 2019, in Application No. 107107508.
Taiwan Intellectual Property Office, Office Action dated Oct. 31, 2019, in Application No. 107107508.
Taiwan Intellectual Property Office, Office Action dated Feb. 11, 2020, in Application No. 107107508.
Taiwan Intellectual Property Office, Office Action dated Aug. 27, 2020, in Application No. 107107508.
Taiwan Intellectual Property Office, Office Action dated Feb. 6, 2018, in Application No. 106130686.
Taiwan Intellectual Property Office, Office Action dated Dec. 27, 2019, in Application No. 108116002.
Taiwan Intellectual Property Office, Office Action dated Apr. 27, 2020, in Application No. 108116002.
Taiwan Intellectual Property Office, Office Action dated Apr. 18, 2016, in Application No. 103140989.
Taiwan Intellectual Property Office, Office Action dated Aug. 23, 2017, in Application No. 106103535.
Taiwan Intellectual Property Office, Office Action dated May 28, 2019, in Application No. 107112306.
Taiwan Intellectual Property Office, Office Action dated Jun. 16, 2020, in Application No. 108136083.
Taiwan Intellectual Property Office, Office Action dated Sep. 9, 2020, in Application No. 108148566.
United States Patent and Trademark Office, Office Action dated Jul. 12, 2019, in U.S. Appl. No. 16/124,739.
United States Patent and Trademark Office, Notice of Allowance dated Dec. 16, 2019, in U.S. Appl. No. 16/124,739.
United States Patent and Trademark Office, Office Action dated Jun. 18, 2020, in U.S. Appl. No. 16/124,739.
United States Patent and Trademark Office, Office Action dated Jun. 30, 2020, in U.S. Appl. No. 16/124,739.
United States Patent and Trademark Office, Office Action dated Oct. 4, 2019, in U.S. Appl. No. 16/385,309.
United States Patent and Trademark Office, Notice of Allowance dated Apr. 16, 2020, in U.S. Appl. No. 16/385,309.
United States Patent and Trademark Office, Notice of Allowance dated Jun. 18, 2020, in U.S. Appl. No. 16/385,309.
United States Patent and Trademark Office, Notice of Allowance dated Mar. 26, 2020, in U.S. Appl. No. 16/566,701.
United States Patent and Trademark Office, Office Action dated Jul. 16, 2020, in U.S. Appl. No. 16/566,701.
United States Patent and Trademark Office, Notice of Allowance dated Jun. 5, 2020, in U.S. Appl. No. 16/661,897.
United States Patent and Trademark Office, Office Action dated Jul. 2, 2020, in U.S. Appl. No. 16/661,897.
United States Patent and Trademark Office, Office Action dated Jul. 23, 2020, in U.S. Appl. No. 16/804,918.
United States Patent and Trademark Office, Office Action dated Oct. 30, 2020, in U.S. Appl. No. 16/809,405.
United States Patent and Trademark Office, Office Action dated Jun. 30, 2020, in U.S. Appl. No. 16/809,447.
United States Patent and Trademark Office, Office Action dated Apr. 17, 2019, in U.S. Appl. No. 16/119,952.
United States Patent and Trademark Office, Office Action dated Oct. 10, 2019, in U.S. Appl. No. 16/119,952.
United States Patent and Trademark Office, Office Action dated Mar. 24, 2020, in U.S. Appl. No. 16/119,952.
United States Patent and Trademark Office, Office Action dated Oct. 5, 2020, in U.S. Appl. No. 16/119,952.
China Patent Office, Office Action dated Feb. 1, 2021, in Application No. 201911140844.5.
China Patent Office, Office Action dated Feb. 3, 2021, in Application No. 201911316902.5.
Taiwan Intellectual Property Office, Office Action dated Nov. 30, 2020, in Application No. 107107508.
Taiwan Intellectual Property Office, Office Action dated Jan. 4, 2021, in Application No. 109111042.
Taiwan Intellectual Property Office, Office Action dated Jan. 21, 2021, in Application No. 109108798.
United States Patent and Trademark Office, Office Action dated Nov. 23, 2020, in U.S. Appl. No. 16/124,739.
United States Patent and Trademark Office, Notice of Allowance dated Dec. 28, 2020, in U.S. Appl. No. 16/385,309.
United States Patent and Trademark Office, Notice of Allowance dated Nov. 18, 2020, in U.S. Appl. No. 16/566,701.
United States Patent and Trademark Office, Notice of Allowance dated Jan. 1, 2021, in U.S. Appl. No. 16/566,701.
United States Patent and Trademark Office, Notice of Allowance dated Dec. 2, 2020, in U.S. Appl. No. 16/661,897.
United States Patent and Trademark Office, Notice of Allowance dated Jan. 25, 2021, in U.S. Appl. No. 16/804,918.
United States Patent and Trademark Office, Office Action dated Jan. 22, 2021, in U.S. Appl. No. 16/809,447.
United States Patent and Trademark Office, Office Action dated Dec. 14, 2020, in U.S. Appl. No. 16/944,665.
United States Patent and Trademark Office, Notice of Allowance dated Mar. 10, 2021, in U.S. Appl. No. 16/119,952.
China Patent Office, Office Action dated Apr. 15, 2021, in Application No. 201911371960.8.
Qi et al., "Sine Wave Dimming Circuit Based on PIC16 MCU," *Electronic Technology Application in 2014*, vol. 10, (2014).
United States Patent and Trademark Office, Office Action dated Apr. 22, 2021, in U.S. Appl. No. 16/791,329.
United States Patent and Trademark Office, Notice of Allowance dated Apr. 8, 2021, in U.S. Appl. No. 16/809,405.
China Patent Office, Office Action dated Apr. 30, 2021, in Application No. 201910719931.X.
China Patent Office, Office Action dated May 26, 2021, in Application No. 201910124049.0.
Taiwan Intellectual Property Office, Office Action dated Apr. 7, 2021, in Application No. 109111042.
United States Patent and Trademark Office, Notice of Allowance dated May 5, 2021, in U.S. Appl. No. 16/124,739.
United States Patent and Trademark Office, Notice of Allowance dated Aug. 18, 2021, in U.S. Appl. No. 16/124,739.
United States Patent and Trademark Office, Notice of Allowance dated Aug. 31, 2021, in U.S. Appl. No. 16/791,329.
United States Patent and Trademark Office, Notice of Allowance dated Jul. 20, 2021, in U.S. Appl. No. 16/809,405.
United States Patent and Trademark Office, Notice of Allowance dated May 26, 2021, in U.S. Appl. No. 16/809,447.
United States Patent and Trademark Office, Notice of Allowance dated Aug. 25, 2021, in U.S. Appl. No. 16/809,447.
United States Patent and Trademark Office, Notice of Allowance dated Aug. 2, 2021, in U.S. Appl. No. 16/944,665.
United States Patent and Trademark Office, Notice of Allowance dated Jul. 7, 2021, in U.S. Appl. No. 17/127,711.
United States Patent and Trademark Office, Notice of Allowance dated May 20, 2021, in U.S. Appl. No. 16/119,952.
United States Patent and Trademark Office, Notice of Allowance dated Aug. 27, 2021, in U.S. Appl. No. 16/119,952.
China Patent Office, Notice of Allowance dated Sep. 1, 2021, in Application No. 201911371960.8.
United States Patent and Trademark Office, Notice of Allowance dated Oct. 4, 2021, in U.S. Appl. No. 17/096,741.
United States Patent and Trademark Office, Notice of Allowance dated Oct. 20, 2021, in U.S. Appl. No. 16/944,665.
United States Patent and Trademark Office, Notice of Allowance dated Sep. 22, 2021, in U.S. Appl. No. 17/127,711.
United States Patent and Trademark Office, Office Action dated Oct. 5, 2021, in U.S. Appl. No. 17/023,615.
China Patent Office, Office Action dated Nov. 23, 2021, in Application No. 201911140844.5.

\* cited by examiner

SYSTEMS AND METHODS FOR DIMMING CONTROL RELATED TO TRIAC DIMMERS ASSOCIATED WITH LED LIGHTING

1. CROSS-REFERENCES TO RELATED APPLICATIONS

This application claims priority to Chinese Patent Application No. 201911140844.5, filed Nov. 20, 2019, incorporated by reference herein for all purposes.

2. BACKGROUND OF THE INVENTION

Certain embodiments of the present invention are directed to circuits. More particularly, some embodiments of the invention provide systems and methods for dimming control related to Triode for Alternating Current (TRIAC) dimmers. Merely by way of example, some embodiments of the invention have been applied to light emitting diodes (LEDs). But it would be recognized that the invention has a much broader range of applicability.

With development in the light-emitting diode (LED) lighting market, many LED manufacturers have placed LED lighting products at an important position in market development. LED lighting products often need dimmer technology to provide consumers with a unique visual experience. Since Triode for Alternating Current (TRIAC) dimmers have been widely used in conventional lighting systems such as incandescent lighting systems, the TRIAC dimmers are also increasingly being used in LED lighting systems.

Conventionally, the TRIAC dimmers usually are designed primarily for incandescent lights with pure resistive loads and low luminous efficiency. Such characteristics of incandescent lights often help to meet the requirements of TRIAC dimmers in holding currents. Therefore, the TRIAC dimmers usually are suitable for light dimming when used with incandescent lights.

However, when the TRIAC dimmers are used with more efficient LEDs, it is often difficult to meet the requirements of TRIAC dimmers in holding currents due to the reduced input power needed to achieve illumination equivalent to that of incandescent lights. Therefore, a conventional LED lighting system often utilizes a bleeder unit to provide a bleeder current in order to support the TRIAC dimmer for linear operation and to avoid undesirable distortion of a rectified voltage (e.g., VIN) and also blinking of the LEDs. For example, under a conventional mechanism, the bleeder current is generated if the rectified voltage (e.g., VIN) is so low that the current flowing through the TRIAC dimmer is below the holding current, but the bleeder current is not generated if the rectified voltage (e.g., VIN) is so high that the current flowing through the TRIAC dimmer is higher than the holding current. As an example, under the conventional mechanism, when the rectified voltage (e.g., VIN) becomes low and the current flowing through the TRIAC dimmer becomes lower than the holding current, the bleeder current is generated without a predetermined delay.

FIG. 1 is an exemplary circuit diagram showing a conventional LED lighting system using a TRIAC dimmer. As shown in FIG. 1, the LED lighting system 100 includes a TRIAC dimmer 110, a rectifier BD1, one or more LEDs 120, a control unit U1 for LED output current, a bleeder unit U2, a voltage detection unit 130 including resistors R3 and R4, a phase detection unit 140, and a bleeder current control unit 150.

After the system 100 is powered on, an AC input voltage (e.g., VAC) is received by the TRIAC dimmer 110 and rectified by the rectifier BD1 to generate a rectified voltage (e.g., VIN). The rectified voltage (e.g., VIN) is used to control an output current that flows through the one or more LEDs 120.

As shown in FIG. 1, the rectified voltage (e.g., VIN) is received by the voltage detection unit 130, which in response outputs a sensing signal (e.g., LS) to the phase detection unit 140. The phase detection unit 140 detects, based on at least information associated with the sensing signal (e.g., LS), a phase range within which the TRIAC dimmer 110 is in a conduction state. Additionally, the phase detection unit 140 uses the detected phase range to adjust a reference voltage (e.g., Vref1) received by an amplifier 162 of the control unit U1 in order to change the output current that flows through the one or more LEDs 120 and also change brightness of the one or more LEDs 120.

Additionally, the voltage detection unit 130 outputs the sensing signal (e.g., LS) to the bleeder current control unit 150, which also receives a sensing signal 163 from the control unit U1 for LED output current. In response, the bleeder current control unit 150 adjusts, based at least in part on a change of the sensing signal (e.g., LS) and/or a change of the sensing signal 163, a bleeder current 171 that is generated by the bleeder unit U2. The bleeder current 171 is used to maintain normal operation of the TRIAC dimmer 110. As shown in FIG. 1, the bleeder current 171 is adjusted based on at least information associated with the rectified voltage (e.g., VIN) and the output current that flows through the one or more LEDs 120 in order to improve dimming effect.

FIG. 2 shows simplified conventional timing diagrams for the LED lighting system using the TRIAC dimmer as shown in FIG. 1 without a predetermined delay. As shown in FIG. 2, the waveform 210 represents the rectified voltage (e.g., VIN) as a function of time, the waveform 220 represents the output current (e.g., $I_{led}$) flowing through the one or more LEDs 120 as a function of time, and the waveform 230 represents the bleeder current 171 (e.g., $I_{bleed}$) that is generated without the predetermined delay as a function of time.

As shown by the waveforms 210 and 220, when the rectified voltage (e.g., VIN) becomes larger than the forward bias voltage (e.g., VO) of the one or more LEDs 120, the output current (e.g., $I_{led}$) flowing through the one or more LEDs 120 rises from zero to a magnitude that is larger than zero, but when the rectified voltage (e.g., VIN) becomes smaller than the forward bias voltage (e.g., VO) of the one or more LEDs 120, the output current (e.g., $I_{led}$) flowing through the one or more LEDs 120 drops from the magnitude that is larger than zero to zero. As shown by the waveforms 220 and 230, after the output current (e.g., lied) flowing through the one or more LEDs 120 becomes smaller than the holding current of the TRIAC dimmer 110, without the predetermined delay, the bleeder unit U2 generates the bleeder current 171 so that the total current that flows through the TRIAC dimmer 110 is larger than the holding current of the TRIAC dimmer 110.

The control mechanism as shown in FIG. 2 often can avoid undesirable distortion of the rectified voltage (e.g., VIN) and therefore maintain satisfactory performance of dimming control. Nonetheless, this control mechanism often generates the bleeder current 171 that is larger than zero in magnitude when the rectified voltage (e.g., VIN) is still relatively large in magnitude even though the rectified voltage (e.g., VIN) has already become smaller than the forward bias voltage (e.g., VO) of the one or more LEDs

120. Hence, the control mechanism as shown in FIG. 2 usually reduce the energy efficiency of the LED lighting system 100.

To improve the energy efficiency, under another conventional mechanism, when the rectified voltage (e.g., VIN) becomes low and the current flowing through the TRIAC dimmer becomes lower than the holding current, the bleeder current is generated after a predetermined delay. As an example, the predetermined delay is larger than zero. For example, as shown in FIG. 1, with the predetermined delay after the output current that flows through the one or more LEDs 120 becomes smaller than the holding current of the TRIAC dimmer 110, the bleeder current 171 is generated.

Hence it is highly desirable to improve the techniques related to LED lighting systems.

3. BRIEF SUMMARY OF THE INVENTION

Certain embodiments of the present invention are directed to circuits. More particularly, some embodiments of the invention provide systems and methods for dimming control related to Triode for Alternating Current (TRIAC) dimmers. Merely by way of example, some embodiments of the invention have been applied to light emitting diodes (LEDs). But it would be recognized that the invention has a much broader range of applicability.

According to some embodiments, a system for controlling one or more light emitting diodes includes: a voltage detector configured to receive a rectified voltage associated with a TRIAC dimmer and generated by a rectifying bridge and generate a first sensing signal representing the rectified voltage; a distortion detector configured to receive the first sensing signal, determine whether the rectified voltage is distorted or not based at least in part on the first sensing signal, and generate a distortion detection signal indicating whether the rectified voltage is distorted or not; a phase detector configured to receive the first sensing signal and generate a phase detection signal indicating a detected phase range within which the TRIAC dimmer is in a conduction state based at least in part on the first sensing signal; a voltage generator configured to receive the phase detection signal from the phase detector, receive the distortion detection signal from the distortion detector, and generate a reference voltage based at least in part on the phase detection signal and the distortion detection signal; a current regulator configured to receive the reference voltage from the voltage generator, receive a diode current flowing through the one or more light emitting diodes, and generate a second sensing signal representing the diode current; a bleeder controller configured to receive the second sensing signal from the current regulator and generate a bleeder control signal based at least in part on the second sensing signal, the bleeder control signal indicating whether a bleeder current is allowed or not allowed to be generated; and a bleeder configured to receive the bleeder control signal from the bleeder controller and generate a bleeder current based at least in part on the bleeder control signal; wherein the voltage generator is further configured to, if the distortion detection signal indicates that the rectified voltage is distorted: perform a phase compensation to the detected phase range within which the TRIAC dimmer is in the conduction state to generate a compensated phase range; and use the compensated phase range to generate the reference voltage.

According to certain embodiments, a system for controlling one or more light emitting diodes, the system comprising: a voltage detector configured to receive a rectified voltage associated with a TRIAC dimmer and generated by a rectifying bridge and generate a first sensing signal representing the rectified voltage; a distortion detector configured to receive the first sensing signal, determine whether the rectified voltage is distorted or not based at least in part on the first sensing signal, and generate a distortion detection signal indicating whether the rectified voltage is distorted or not; a phase detection and voltage generator configured to receive the first sensing signal, detect a phase range within which the TRIAC dimmer is in a conduction state based at least in part on the first sensing signal, and generate a reference voltage based at least in part on the detected phase range; a current regulator configured to receive the reference voltage from the phase detection and voltage generator, receive a diode current flowing through the one or more light emitting diodes, and generate a second sensing signal representing the diode current; a bleeder controller configured to receive the second sensing signal from the current regulator, receive the distortion detection signal from the distortion detector, and generate a first bleeder control signal and a second bleeder control signal based at least in part on the second sensing signal and the distortion detection signal, the first bleeder control signal indicating whether a bleeder current is allowed or not allowed to be generated; and a bleeder configured to receive the first bleeder control signal and the second bleeder control signal from the bleeder controller and generate the bleeder current based at least in part on the first bleeder control signal and the second bleeder control signal; wherein the bleeder controller is further configured to, if the distortion detection signal indicates that the rectified voltage is distorted and if the second sensing signal changes from being larger than a predetermined threshold to being smaller than the predetermined threshold: immediately change the first bleeder control signal from indicating the bleeder current is not allowed to be generated to indicating the bleeder current is allowed to be generated; immediately generate the second bleeder control signal at a first logic level; and after a predetermined delay of time, change the second bleeder control signal from the first logic level to a second logic level, the predetermined delay of time being larger than zero; wherein the bleeder is further configured to, if the first bleeder control signal changes from indicating the bleeder current is not allowed to be generated to indicating the bleeder current is allowed to be generated: generate the bleeder current at a first current magnitude if the second bleeder control signal is at the first logic level; and generate the bleeder current at a second current magnitude if the second bleeder control signal is at the second logic level; wherein the first current magnitude is smaller than the second current magnitude.

According to some embodiments, a method for controlling one or more light emitting diodes includes: receiving a rectified voltage associated with a TRIAC dimmer; generating a first sensing signal representing the rectified voltage; receiving the first sensing signal; determining whether the rectified voltage is distorted or not based at least in part on the first sensing signal; generating a distortion detection signal indicating whether the rectified voltage is distorted or not; generating a phase detection signal indicating a detected phase range within which the TRIAC dimmer is in a conduction state based at least in part on the first sensing signal; receiving the phase detection signal and the distortion detection signal; generating a reference voltage based at least in part on the phase detection signal and the distortion detection signal; receiving the reference voltage and a diode current flowing through the one or more light emitting diodes; generating a second sensing signal representing the diode current; receiving the second sensing signal; generating a bleeder control signal based at least in part on the second sensing signal, the bleeder control signal indicating whether a bleeder current is allowed or not allowed to be generated; receiving the bleeder control signal; and generating a bleeder current based at least in part on the bleeder control signal; wherein the generating a reference voltage based at least in part on the phase detection signal and the distortion detection signal includes, if the distortion detection signal indicates that the rectified voltage is distorted: performing a phase compensation to the detected phase range within which the TRIAC dimmer is in the conduction state to generate a compensated phase range; and using the compensated phase range to generate the reference voltage.

According to certain embodiments, a method for controlling one or more light emitting diodes includes: receiving a rectified voltage associated with a TRIAC dimmer; generating a first sensing signal representing the rectified voltage; receiving the first sensing signal; determining whether the rectified voltage is distorted or not based at least in part on the first sensing signal; generating a distortion detection signal indicating whether the rectified voltage is distorted or not; detecting a phase range within which the TRIAC dimmer is in a conduction state based at least in part on the first sensing signal; generating a reference voltage based at least in part on the detected phase range; receiving the reference voltage and a diode current flowing through the one or more light emitting diodes; generating a second sensing signal representing the diode current; receiving the second sensing signal and the distortion detection signal; generating a first bleeder control signal and a second bleeder control signal based at least in part on the second sensing signal and the distortion detection signal, the first bleeder control signal indicating whether a bleeder current is allowed or not allowed to be generated; receiving the first bleeder control signal and the second bleeder control signal; and generating the bleeder current based at least in part on the first bleeder control signal and the second bleeder control signal; wherein the generating a first bleeder control signal and a second bleeder control signal based at least in part on the second sensing signal and the distortion detection signal includes, if the distortion detection signal indicates that the rectified voltage is distorted and if the second sensing signal changes from being larger than a predetermined threshold to being smaller than the predetermined threshold: immediately changing the first bleeder control signal from indicating the bleeder current is not allowed to be generated to indicating the bleeder current is allowed to be generated; immediately generating the second bleeder control signal at a first logic level; and after a predetermined delay of time, changing the second bleeder control signal from the first logic level to a second logic level, the predetermined delay of time being larger than zero; wherein the generating the bleeder current based at least in part on the first bleeder control signal and the second bleeder control signal includes, if the first bleeder control signal changes from indicating the bleeder current is not allowed to be generated to indicating the bleeder current is allowed to be generated: generating the bleeder current at a first current magnitude if the second bleeder control signal is at the first logic level; and generating the bleeder current at a second current magnitude if the second bleeder control signal is at the second logic level; wherein the first current magnitude is smaller than the second current magnitude.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to circuits. More particularly, some embodiments of the invention provide systems and methods for dimming control related to Triode for Alternating Current (TRIAC) dimmers. Merely by way of example, some embodiments of the invention have been applied to light emitting diodes (LEDs). But it would be recognized that the invention has a much broader range of applicability.

Figure 1:
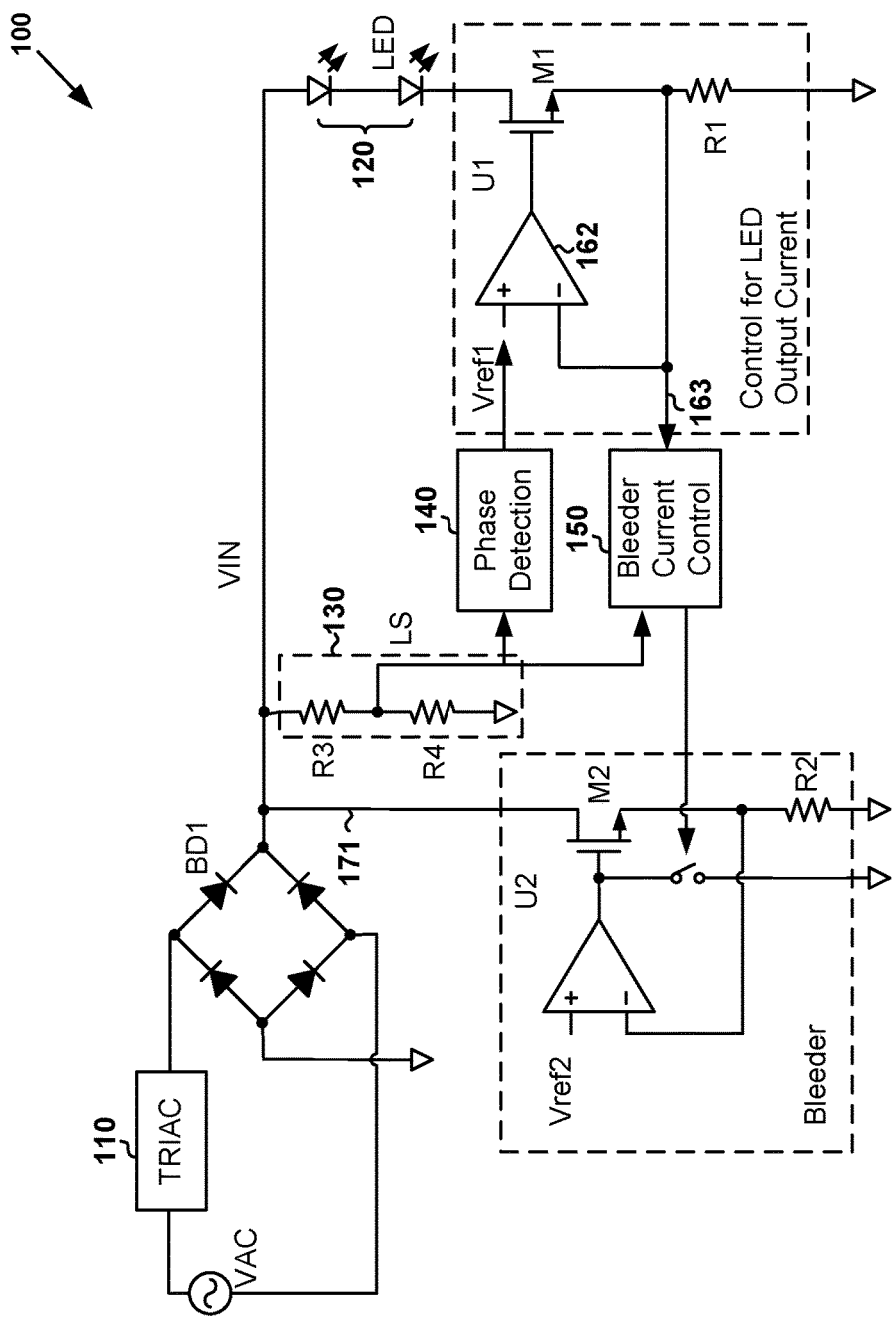
FIG. 1 is an exemplary circuit diagram showing a conventional LED lighting system using a TRIAC dimmer.
Figure 2:
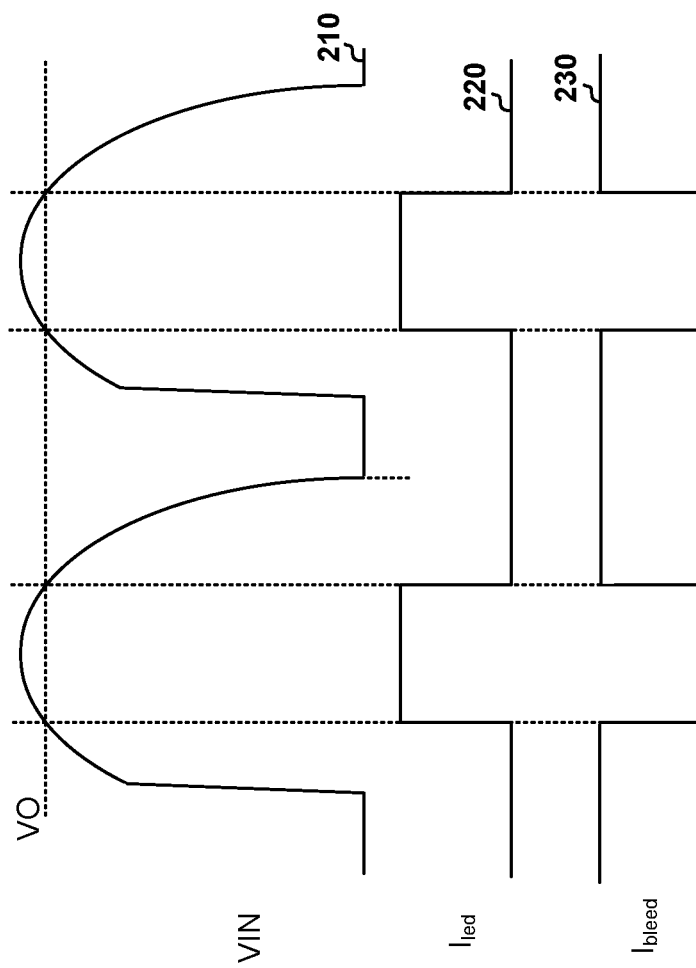
FIG. 2 shows simplified conventional timing diagrams for the LED lighting system using the TRIAC dimmer as shown in FIG. 1 without a predetermined delay.
Figure 3:
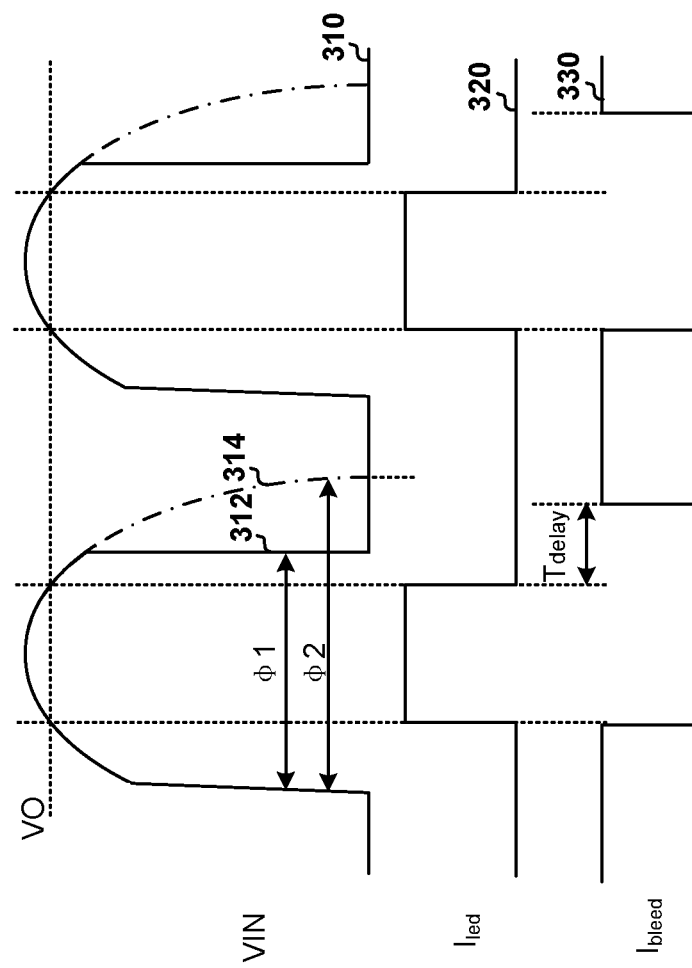
FIG. 3 shows simplified timing diagrams for the LED lighting system using the TRIAC dimmer as shown in FIG. 1 with the predetermined delay according to some embodiments.

FIG. 3 shows simplified timing diagrams for the LED lighting system using the TRIAC dimmer as shown in FIG. 1 with the predetermined delay according to some embodiments. These diagrams are merely examples, which should not unduly limit the scope of the claims. One of ordinary skill in the art would recognize many variations, alternatives, and modifications. As shown in FIG. 3, the waveform 310 represents the rectified voltage (e.g., VIN) as a function of time, the waveform 320 represents the output current (e.g., $I_{led}$) flowing through the one or more LEDs 120 as a function of time, and the waveform 330 represents the bleeder current 171 (e.g., $I_{bleed}$) that is generated with the predetermined delay as a function of time.

In some examples, as shown by the waveforms 310 and 320, when the rectified voltage (e.g., VIN) becomes larger than the forward bias voltage (e.g., VO) of the one or more LEDs 120, the output current (e.g., $I_{led}$) flowing through the one or more LEDs 120 rises from zero to a magnitude that is larger than zero, but when the rectified voltage (e.g., VIN) becomes smaller than the forward bias voltage (e.g., VO) of the one or more LEDs 120, the output current (e.g., Ilea) flowing through the one or more LEDs 120 drops to zero from the magnitude that is larger than zero. In certain examples, as shown by the waveforms 320 and 330, after the output current (e.g., $I_{led}$) flowing through the one or more LEDs 120 becomes smaller than the holding current of the TRIAC dimmer 110, with the predetermined delay (e.g., $T_{delay}$), the bleeder unit U2 generates the bleeder current 171 so that the total current that flows through the TRIAC dimmer 110 becomes larger than the holding current of the TRIAC dimmer 110. For example, the predetermined delay is larger than zero.

Referring to FIG. 3, the control mechanism for the bleeder current 171 as implemented by the LED lighting system 100 can cause undesirable distortion of the rectified voltage (e.g., VIN) according to some embodiments. In certain examples, such undesirable distortion of the rectified voltage (e.g., VIN) can adversely affect the determination of the phase range within which the TRIAC dimmer 110 is in the conduction state and thus also adversely affect the dimming effect of the one or more LEDs 120. In some examples, such undesirable distortion of the rectified voltage (e.g., VIN) can reduce the range of adjustment for the brightness of the one or more LEDs 120. As an example, the reduced range of adjustment for the brightness does not cover from 20% to 80% of the full brightness of the one or more LEDs 120, so the LED lighting system 100 does not satisfy certain requirement of the Energy Star V2.0. For example, such undesirable distortion of the rectified voltage (e.g., VIN) can make the determined phase range smaller than the actual phase range within which the TRIAC dimmer 110 is in the conduction state, so the maximum of the range of adjustment for the brightness becomes less than 80% of the full brightness of the LEDs 120.

As shown by the waveform 310, during the predetermined delay (e.g., $T_{delay}$), the bleeder current 171 remains equal to zero in magnitude, so the total current that flows through the TRIAC dimmer 110 is smaller than the holding current of the TRIAC dimmer 110 according to certain embodiments. For example, the predetermined delay is larger than zero. In some examples, during the predetermined delay (e.g., $T_{delay}$), the TRIAC dimmer 110 cannot sustain the linear operation, causing undesirable distortion of the rectified voltage (e.g., VIN). For example, the waveform 310 includes a segment 312, but the segment 312 deviates from a segment 314 as shown in FIG. 3. In certain examples, this deviation of the segment 312 from the segment 314 shows the undesirable distortion of the rectified voltage (e.g., VIN), and this undesirable distortion causes the determined phase range within which the TRIAC dimmer 110 is in the conduction state to be inaccurate. As an example, with the undesirable distortion, the determined phase range within which the TRIAC dimmer 110 is in the conduction state is equal to $\phi 1$; in contrast, without the undesirable distortion, the determined phase range within which the TRIAC dimmer 110 is in the conduction state is equal to $\phi 2$, wherein $\phi 1$ is smaller than $\phi 2$. For example, this undesirable distortion reduces the range of adjustment for the brightness of the LEDs 120, even to the extent that the maximum of the range of adjustment for the brightness becomes less than 80% of the full brightness of the LEDs 120, even though the Energy Star V2.0 needs the maximum to be at least 80% of the full brightness.

Figure 4:
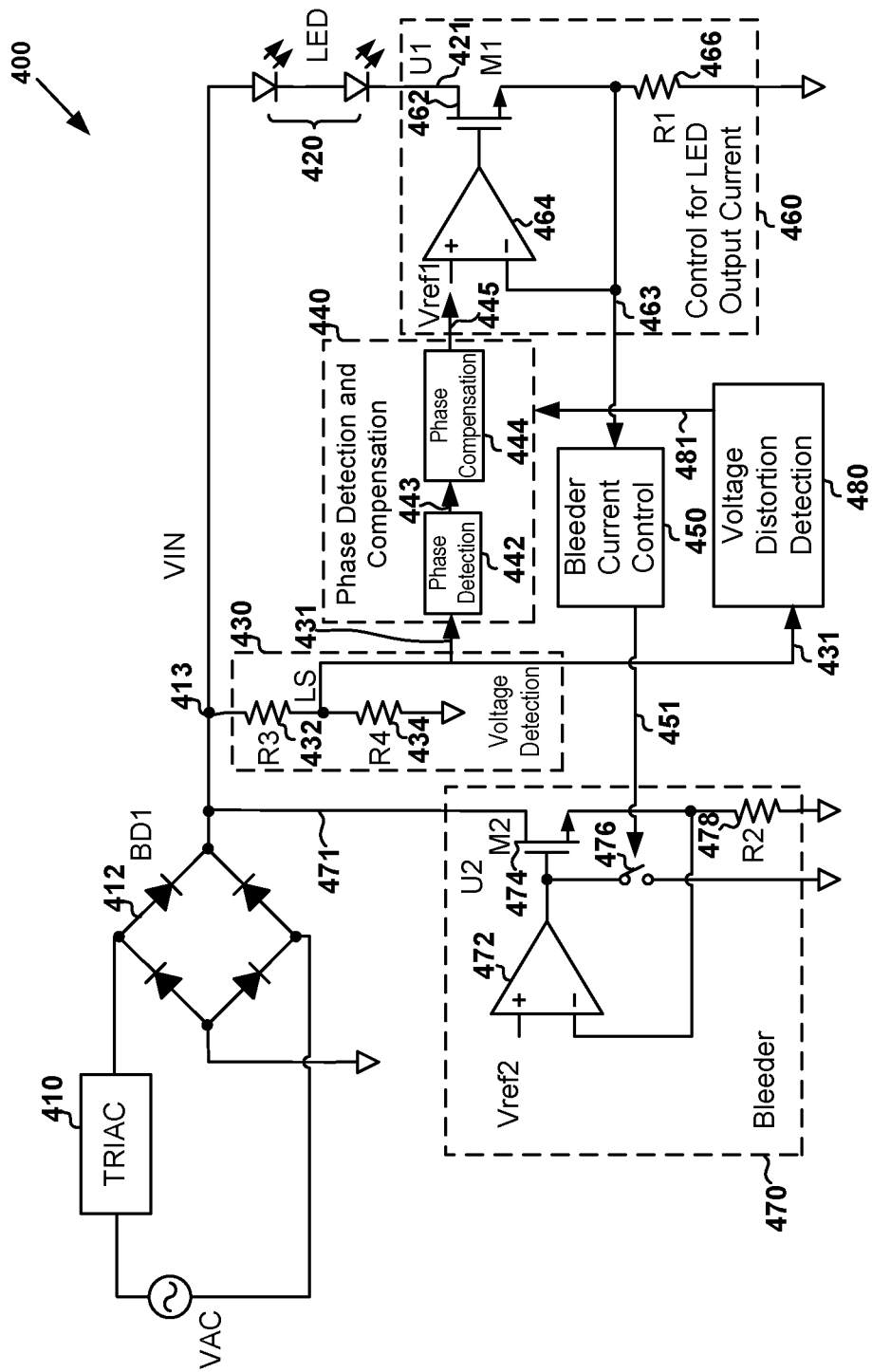
FIG. 4 is a circuit diagram showing an LED lighting system using a TRIAC dimmer according to some embodiments of the present invention.

FIG. 4 is a circuit diagram showing an LED lighting system using a TRIAC dimmer according to some embodiments of the present invention. This diagram is merely an example, which should not unduly limit the scope of the claims. One of ordinary skill in the art would recognize many variations, alternatives, and modifications. As shown in FIG. 4, the LED lighting system 400 includes a TRIAC dimmer 410, a rectifier 412 (e.g., BD1), one or more LEDs 420, a bleeder current control unit 450, a control unit 460 (e.g., U1) for LED output current, a bleeder unit 470 (e.g., U2), and a dimming control system according to certain embodiments. In some examples, the dimming control system includes a voltage detection unit 430, a phase detection and compensation unit 440, and a voltage distortion detection unit 480. Although the above has been shown using a selected group of components for the LED lighting system, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In certain embodiments, after the system 400 is powered on, an AC input voltage (e.g., VAC) is received by the TRIAC dimmer 410 and rectified by the rectifier 412 (e.g., BD1) to generate a rectified voltage 413 (e.g., VIN). For example, the rectified voltage 413 (e.g., VIN) is used to control an output current 421 that flows through the one or more LEDs 420. In some embodiments, the rectified voltage 413 (e.g., VIN) is received by the voltage detection unit 430, which in response outputs a sensing signal 431 (e.g., LS) to the phase detection and compensation unit 440 and the voltage distortion detection unit 480. For example, the voltage detection unit 430 includes a resistor 432 (e.g., R3) and a resistor 434 (e.g., R4), and the resistors 432 and 434 form a voltage divider. As an example, the voltage detection unit 430 also includes a sampling circuit, which is configured to sample a processed voltage that is generated by the voltage divider and to generate the sensing signal 431 (e.g., LS) that represents a change of the rectified voltage 413 (e.g., VIN).

According to certain embodiments, the voltage distortion detection unit 480 receives the sensing signal 431 (e.g., LS), determines whether the rectified voltage 413 (e.g., VIN) is distorted or not based at least in part on the sensing signal 431 (e.g., LS), and generates a distortion detection signal 481 that indicates whether the rectified voltage 413 (e.g., VIN) is distorted or not. In some examples, if the TRIAC dimmer 410 is a leading-edge TRIAC dimmer, the voltage distortion detection unit 480 uses the sensing signal 431 (e.g., LS) to determine the downward slope of the falling edge of the rectified voltage 413 (e.g., VIN) and determines whether the rectified voltage 413 (e.g., VIN) is distorted based at least in part on the determined downward slope. For example, whether the TRIAC dimmer 410 is a leading-edge TRIAC dimmer is detected by the LED lighting system 400 or is predetermined.

In certain examples, if the TRIAC dimmer 410 is a leading-edge TRIAC dimmer, the voltage distortion detection unit 480 compares the determined downward slope with a predetermined slope threshold and determines whether the rectified voltage 413 (e.g., VIN) is distorted based at least in part on the comparison between the determined downward slope and the predetermined slope threshold. For example, if the TRIAC dimmer 410 is a leading-edge TRIAC dimmer, the voltage distortion detection unit 480 determines that the rectified voltage 413 (e.g., VIN) is distorted if the determined downward slope is larger than the predetermined slope threshold in magnitude (e.g., if the absolute value of the determined downward slope is larger than the absolute value of the predetermined slope threshold). As an example, if the TRIAC dimmer 410 is a leading-edge TRIAC dimmer, the voltage distortion detection unit 480 determines that the rectified voltage 413 (e.g., VIN) is not distorted if the determined downward slope is not larger than the predetermined slope threshold in magnitude (e.g., if the absolute value of the determined downward slope is not larger than the absolute value of the predetermined slope threshold).

According to some embodiments, the phase detection and compensation unit 440 includes a phase detection sub-unit 442 and a phase compensation sub-unit 444. In certain examples, the phase detection sub-unit 442 receives the sensing signal 431 (e.g., LS) and detects, based on at least information associated with the sensing signal 431 (e.g., LS), a phase range within which the TRIAC dimmer 410 is in a conduction state. For example, the phase detection sub-unit 442 also generates a phase range signal 443 that indicates the detected phase range within which the TRIAC dimmer 410 is in the conduction state.

In some examples, the phase compensation sub-unit 444 receives the phase range signal 443 and the distortion detection signal 481 and generates a reference voltage 445 (e.g., Vref1) based at least in part on the phase range signal 443 and the distortion detection signal 481. For example, if the distortion detection signal 481 indicates that the rectified voltage 413 (e.g., VIN) is distorted, the phase compensation sub-unit 444 performs a phase compensation to the detected phase range within which the TRIAC dimmer 410 is in the conduction state as indicated by the phase range signal 443, and uses the compensated phase range to generate the reference voltage 445 (e.g., Vref1). As an example, if the distortion detection signal 481 indicates that the rectified voltage 413 (e.g., VIN) is not distorted, the phase compensation sub-unit 444 does not performs a phase compensation to the detected phase range within which the TRIAC dimmer 410 is in the conduction state as indicated by the phase range signal 443, and uses the phase range without compensation to generate the reference voltage 445 (e.g., Vref1).

In certain embodiments, the control unit 460 (e.g., U1) for LED output current receives the reference voltage 445 (e.g., Vref1) and uses the reference voltage 445 (e.g., Vref1) to control the output current 421 that flows through the one or more LEDs 420. In some embodiments, the control unit 460 (e.g., U1) for LED output current includes a transistor 462, an amplifier 464, and a resistor 466. In certain examples, the amplifier 464 includes a positive input terminal (e.g., the "+" input terminal), a negative input terminal (e.g., the "−" input terminal), and an output terminal. For example, the positive input terminal (e.g., the "+" input terminal) of the amplifier 464 receives the reference voltage 445 (e.g., Vref1), the negative input terminal (e.g., the "−" input terminal) of the amplifier 464 is coupled to the source terminal of the transistor 462, and the output terminal of the amplifier 464 is coupled to the gate terminal of the transistor 462. As an example, the drain terminal of the transistor 462 is coupled to the one or more LEDs 420. In some examples, the negative input terminal (e.g., the "−" input terminal) of the amplifier 464 is also coupled to one terminal of the resistor 466 to generate a sensing signal 463, which is proportional to the output current 421 that flows through the one or more LEDs 420. For example, the resistor 466 includes another terminal biased to the ground voltage. As an example, the sensing signal 463 is outputted to the bleeder current control unit 450.

Figure 7:
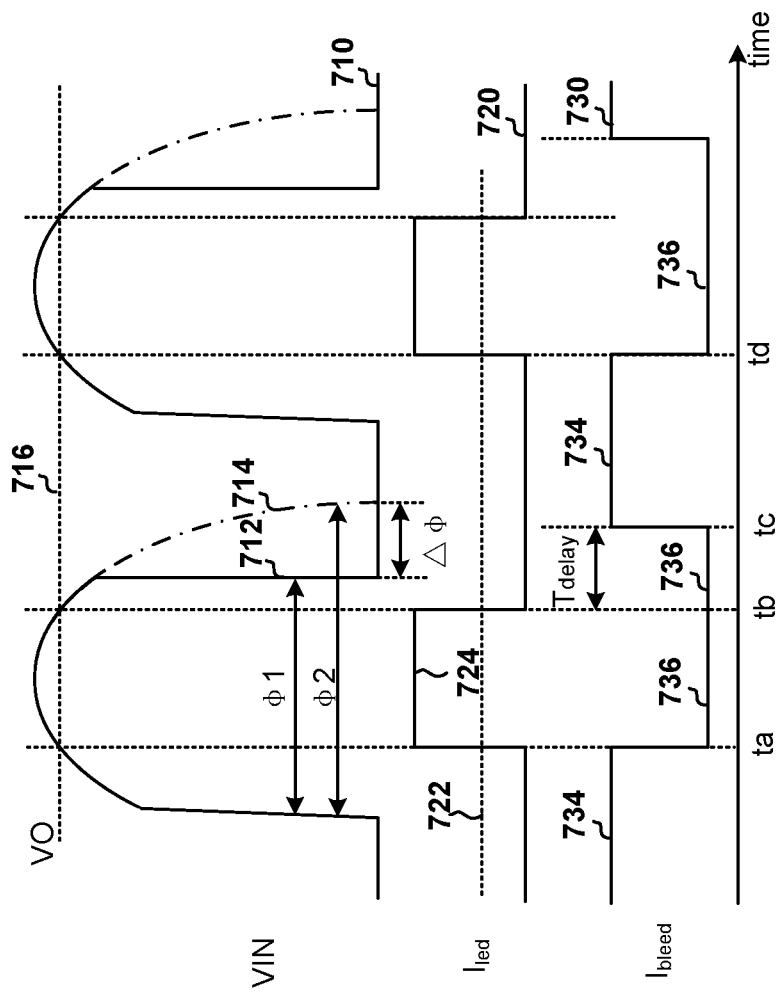
FIG. 7 shows simplified timing diagrams for the LED lighting system using the TRIAC dimmer as shown in FIG. 4 according to certain embodiments of the present invention.

In some embodiments, the bleeder current control unit 450 receives the sensing signal 463 and in response generates a control signal 451. In certain examples, the bleeder unit 470 (e.g., U2) includes a transistor 474, an amplifier 472, a resistor 478, and a switch 476. In some examples, when the sensing signal 463 rises above a predetermined voltage threshold (e.g., at time to when the detected output current 421 rises above the predetermined current threshold 722 as shown by the waveform 720 in FIG. 7), the control signal 451 changes from the logic high level to the logic low level so that the switch 476 changes from being closed to being open so that the bleeder current 471 drops to zero (e.g., the predetermined magnitude 736 as shown by the waveform 730 in FIG. 7), indicating that the bleeder current 471 is not generated. In certain examples, when the sensing signal 463 falls below the predetermined voltage threshold (e.g., at time $t_b$ when the detected output current 421 falls below the predetermined current threshold 722 as shown by the waveform 720 in FIG. 7), after the predetermined delay (e.g., after the time duration $T_{delay}$ from time $t_b$ to time $t_c$ as shown in FIG. 7), the control signal 451 changes from the logic low level to the logic high level so that the switch 476 changes from being open to being closed so that the bleeder current 471 is generated at a predetermined magnitude (e.g., at time $t_c$, increases from the predetermined magnitude 736 to the predetermined magnitude 734 as shown by the waveform 730 in FIG. 7). As an example, the predetermined delay is larger than zero. For example, when the sensing signal 463 rises above the predetermined voltage threshold (e.g., at time $t_d$ when the detected output current 421 rises above the predetermined current threshold 722 as shown by the waveform 720 in FIG. 7), the control signal 451 changes from the logic high level to the logic low level so that the switch 476 changes from being closed to being open and the bleeder current 471 drops from the predetermined magnitude to zero (e.g., at time $t_d$, drops from the predetermined magnitude 734 to zero as shown by the waveform 730 in FIG. 7), indicating that the bleeder current 471 is not generated. As an example, the bleeder current 471 is used to ensure that the current flowing through the TRIAC dimmer 410 does not fall below the holding current of the TRIAC dimmer 410 in order to maintain normal operation of the TRIAC dimmer 410.

Figure 5:
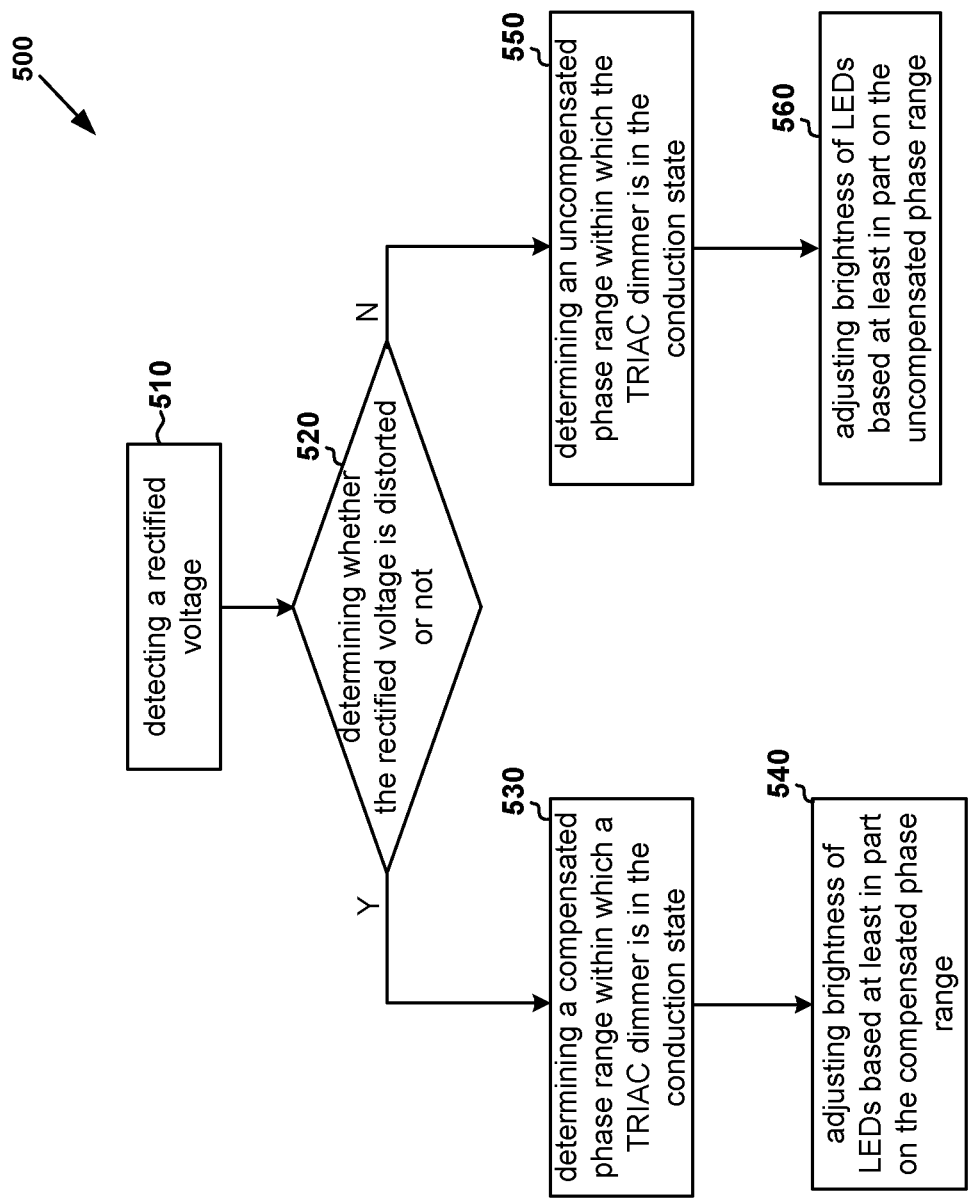
FIG. 5 is a diagram showing a method for the LED lighting system using the TRIAC dimmer as shown in FIG. 4 according to certain embodiments of the present invention.

FIG. 5 is a diagram showing a method for the LED lighting system 400 using the TRIAC dimmer 410 as shown in FIG. 4 according to certain embodiments of the present invention. This diagram is merely an example, which should not unduly limit the scope of the claims. One of ordinary skill in the art would recognize many variations, alternatives, and modifications. The method 500 includes a process 510 for detecting a rectified voltage (e.g., VIN), a process 520 for determining whether the rectified voltage (e.g., VIN) is distorted or not, a process 530 for determining a compensated phase range within which a TRIAC dimmer is in the conduction state, a process 540 for adjusting brightness of LEDs based at least in part on the compensated phase range, a process 550 for determining an uncompensated phase range within which the TRIAC dimmer is in the conduction state, and a process 560 for adjusting brightness of LEDs based at least in part on the uncompensated phase range.

At the process 510, the rectified voltage (e.g., VIN) (e.g., the rectified voltage 413) is detected according to some embodiments. In certain examples, the rectified voltage 413 (e.g., VIN) is received by the voltage detection unit 430, which in response detects the rectified voltage 413 (e.g., VIN) and outputs the sensing signal 431 (e.g., LS) to the phase detection and compensation unit 440 and the voltage distortion detection unit 480. For example, the sensing signal 431 (e.g., LS) represents the magnitude of the rectified voltage 413 (e.g., VIN). In some examples, the voltage detection unit 430 includes the voltage divider and the sampling circuit. For example, the voltage divider includes the resistor 432 (e.g., R3) and the resistor 434 (e.g., R4), and is configured to receive the rectified voltage 413 (e.g., VIN) and generate the processed voltage. As an example, the sampling circuit samples the processed voltage that is generated by the voltage divider and generates the sensing signal 431 (e.g., LS) that represents the change of the rectified voltage 413 (e.g., VIN).

At the process 520, whether the rectified voltage (e.g., VIN) is distorted or not is determined according to certain embodiments. In some examples, the voltage distortion detection unit 480 receives the sensing signal 431 (e.g., LS), determines whether the rectified voltage 413 (e.g., VIN) is distorted or not based at least in part on the sensing signal 431 (e.g., LS), and generates a distortion detection signal 481 that indicates whether the rectified voltage 413 (e.g., VIN) is distorted or not. In certain examples, if the TRIAC dimmer 410 is a leading-edge TRIAC dimmer, the voltage distortion detection unit 480 uses the sensing signal 431 (e.g., LS) to determine the downward slope of the falling edge of the rectified voltage 413 (e.g., VIN) and determines whether the rectified voltage 413 (e.g., VIN) is distorted based at least in part on the determined downward slope. For example, whether the TRIAC dimmer 410 is a leading-edge TRIAC dimmer is detected by the LED lighting system 400 or is predetermined.

In some examples, if the TRIAC dimmer 410 is a leading-edge TRIAC dimmer, the voltage distortion detection unit 480 compares the determined downward slope with a predetermined slope threshold and determines whether the rectified voltage 413 (e.g., VIN) is distorted based at least in part on the comparison between the determined downward slope and the predetermined slope threshold. For example, if the TRIAC dimmer 410 is a leading-edge TRIAC dimmer, the voltage distortion detection unit 480 determines that the rectified voltage 413 (e.g., VIN) is distorted if the determined downward slope is larger than the predetermined slope threshold in magnitude (e.g., if the absolute value of the determined downward slope is larger than the absolute value of the predetermined slope threshold). As an example, if the TRIAC dimmer 410 is a leading-edge TRIAC dimmer, the voltage distortion detection unit 480 determines that the rectified voltage 413 (e.g., VIN) is not distorted if the determined downward slope is not larger than the predetermined slope threshold in magnitude (e.g., if the absolute value of the determined downward slope is not larger than the absolute value of the predetermined slope threshold). In certain examples, if the rectified voltage (e.g., VIN) is determined to be distorted, the processes 530 and 540 are performed, and if the rectified voltage (e.g., VIN) is determined to be not distorted, the processes 550 and 560 are performed.

At the process 530, a compensated phase range within which a TRIAC dimmer is in the conduction state is determined according to some embodiments. In certain examples, the phase detection and compensation unit 440 receives the sensing signal 431 (e.g., LS) and the distortion detection signal 481, and determine the compensated phase range within which the TRIAC dimmer 410 is in the conduction state. In some examples, the compensation to the phase range within which the TRIAC dimmer 410 is in the conduction state is larger than zero in magnitude, and is performed to compensate for the reduction of the phase range caused by the distortion of the rectified voltage 413 (e.g., VIN).

At the process 540, brightness of the LEDs are adjusted based at least in part on the compensated phase range within which the TRIAC dimmer is in the conduction state according to certain embodiments. In some examples, the phase detection and compensation unit 440 uses the compensated phase range to generate the reference voltage 445 (e.g., Vref1) and outputs the reference voltage 445 (e.g., Vref1) to the control unit 460 (e.g., U1) for LED output current. For example, the control unit 460 (e.g., U1) for LED output current receives the reference voltage 445 (e.g., Vref1), and uses the reference voltage 445 (e.g., Vref1) to adjust the output current 421 that flows through the one or more LEDs 420 and also adjust brightness of the one or more LEDs 420.

At the process 550, the uncompensated phase range within which the TRIAC dimmer is in the conduction state is determined according to some embodiments. In certain examples, the phase detection and compensation unit 440 receives the sensing signal 431 (e.g., LS) and the distortion detection signal 481, and determine the uncompensated phase range within which the TRIAC dimmer 410 is in the conduction state. In some examples, the phase detection and compensation unit 440 receives the sensing signal 431 (e.g., LS) and detects, based on at least information associated with the sensing signal 431 (e.g., LS), the phase range within which the TRIAC dimmer 410 is in a conduction state. For example, the phase detection and compensation unit 440 uses the detected phase range as the uncompensated phase range within which the TRIAC dimmer 410 is in the conduction state. As an example, the phase detection and compensation unit 440 performs a compensation that is equal to zero in magnitude to the detected phase range so that the compensated phase range is the same as the uncompensated phase range, and uses this compensated phase range as the uncompensated phase range within which the TRIAC dimmer 410 is in the conduction state.

At the process 560, brightness of the LEDs are adjusted based at least in part on the uncompensated phase range within which the TRIAC dimmer is in the conduction state according to certain embodiments. In some examples, the phase detection and compensation unit 440 uses the uncompensated phase range to generate the reference voltage 445 (e.g., Vref1) and outputs the reference voltage 445 (e.g., Vref1) to the control unit 460 (e.g., U1) for LED output current. For example, the control unit 460 (e.g., U1) for LED output current receives the reference voltage 445 (e.g., Vref1), and uses the reference voltage 445 (e.g., Vref1) to adjust the output current 421 that flows through the one or more LEDs 420 and also adjust brightness of the one or more LEDs 420.

As discussed above and further emphasized here, FIG. 5 is merely an example, which should not unduly limit the scope of the claims. One of ordinary skill in the art would recognize many variations, alternatives, and modifications. For example, regardless of whether the rectified voltage (e.g., the rectified voltage 413) is distorted or not, when the detected output current that flows through the one or more LEDs (e.g., the detected output current 421 that flows through the one or more LEDs 420) falls below a predetermined current threshold, after a predetermined delay, the bleeder current (e.g., the bleeder current 471) is generated to ensure that the current flowing through the TRIAC dimmer (e.g., the TRIAC dimmer 410) does not fall below the holding current of the TRIAC dimmer (e.g., the TRIAC dimmer 410). For example, the predetermined delay is larger than zero.

Figure 6:
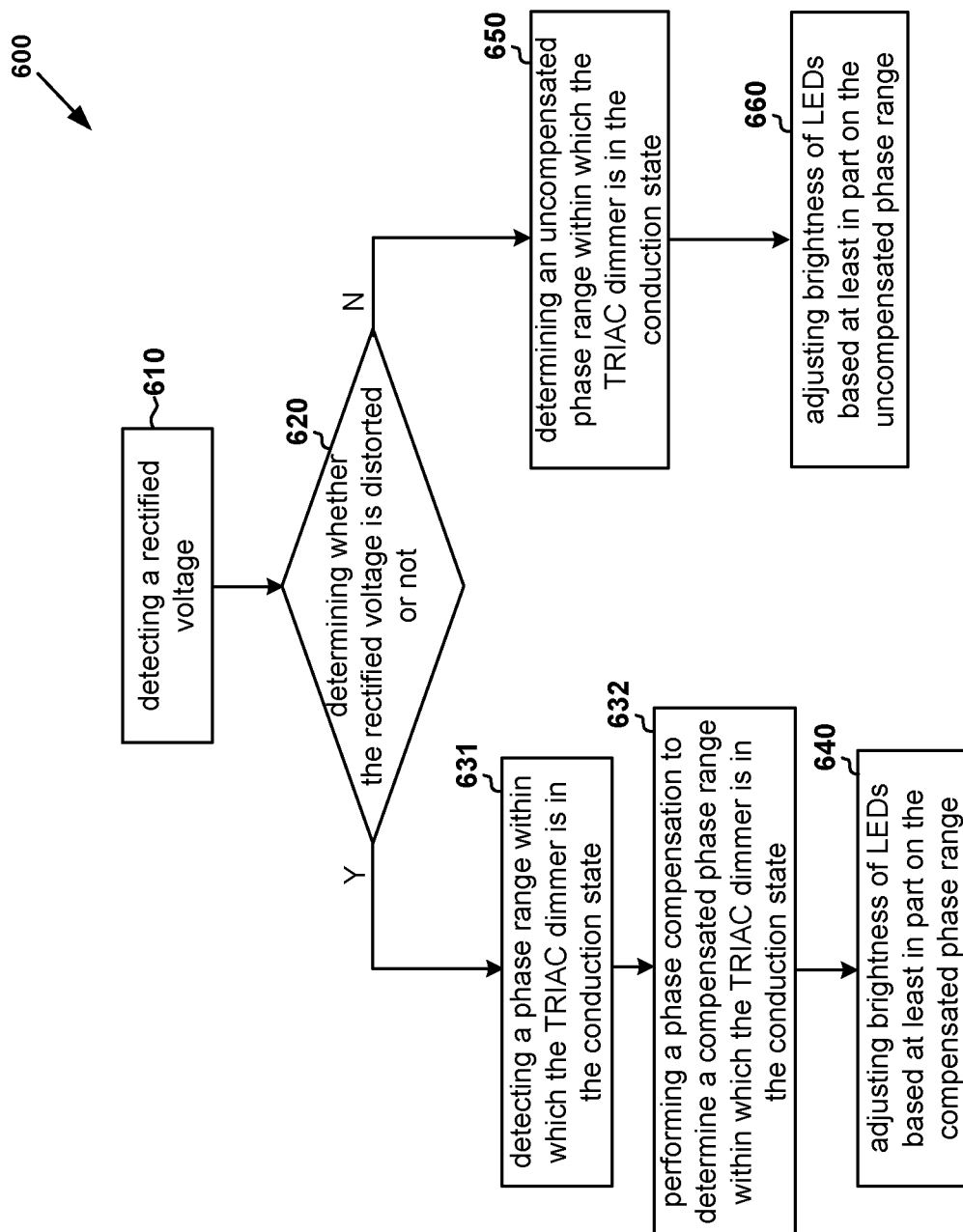
FIG. 6 is a diagram showing a method for the LED lighting system using the TRIAC dimmer as shown in FIG. 4 according to some embodiments of the present invention.

FIG. 6 is a diagram showing a method for the LED lighting system 400 using the TRIAC dimmer 410 as shown in FIG. 4 according to some embodiments of the present invention. This diagram is merely an example, which should not unduly limit the scope of the claims. One of ordinary skill in the art would recognize many variations, alternatives, and modifications. The method 600 includes a process 610 for detecting a rectified voltage (e.g., VIN), a process 620 for determining whether the rectified voltage (e.g., VIN) is distorted or not, a process 631 for detecting a phase range within which the TRIAC dimmer is in the conduction state, a process 632 for performing a phase compensation to determine a compensated phase range within which the TRIAC dimmer is in the conduction state, a process 640 for adjusting brightness of LEDs based at least in part on the compensated phase range, a process 650 for determining an uncompensated phase range within which the TRIAC dimmer is in the conduction state, and a process 660 for adjusting brightness of LEDs based at least in part on the uncompensated phase range.

At the process 610, the rectified voltage (e.g., VIN) (e.g., the rectified voltage 413) is detected according to some embodiments. In certain examples, the rectified voltage 413 (e.g., VIN) is received by the voltage detection unit 430, which in response detects the rectified voltage 413 (e.g., VIN) and outputs the sensing signal 431 (e.g., LS) to the phase detection and compensation unit 440 and the voltage distortion detection unit 480. For example, the sensing signal 431 (e.g., LS) represents the magnitude of the rectified voltage 413 (e.g., VIN). In some examples, the voltage detection unit 430 includes the voltage divider and the sampling circuit. For example, the voltage divider includes the resistor 432 (e.g., R3) and the resistor 434 (e.g., R4), and is configured to receive the rectified voltage 413 (e.g., VIN) and generate the processed voltage. As an example, the sampling circuit samples the processed voltage that is generated by the voltage divider and generates the sensing signal 431 (e.g., LS) that represents the change of the rectified voltage 413 (e.g., VIN).

At the process 620, whether the rectified voltage (e.g., VIN) is distorted or not is determined according to certain embodiments. In some examples, the voltage distortion detection unit 480 receives the sensing signal 431 (e.g., LS), determines whether the rectified voltage 413 (e.g., VIN) is distorted or not based at least in part on the sensing signal 431 (e.g., LS), and generates a distortion detection signal 481 that indicates whether the rectified voltage 413 (e.g., VIN) is distorted or not. In certain examples, if the TRIAC dimmer 410 is a leading-edge TRIAC dimmer, the voltage distortion detection unit 480 uses the sensing signal 431 (e.g., LS) to determine the downward slope of the falling edge of the rectified voltage 413 (e.g., VIN) and determines whether the rectified voltage 413 (e.g., VIN) is distorted based at least in part on the determined downward slope. For example, whether the TRIAC dimmer 410 is a leading-edge TRIAC dimmer is detected by the LED lighting system 400 or is predetermined.

In some examples, if the TRIAC dimmer 410 is a leading-edge TRIAC dimmer, the voltage distortion detection unit 480 compares the determined downward slope with a predetermined slope threshold and determines whether the rectified voltage 413 (e.g., VIN) is distorted based at least in part on the comparison between the determined downward slope and the predetermined slope threshold. For example, if the TRIAC dimmer 410 is a leading-edge TRIAC dimmer, the voltage distortion detection unit 480 determines that the rectified voltage 413 (e.g., VIN) is distorted if the determined downward slope is larger than the predetermined slope threshold in magnitude (e.g., if the absolute value of the determined downward slope is larger than the absolute value of the predetermined slope threshold). As an example, if the TRIAC dimmer 410 is a leading-edge TRIAC dimmer, the voltage distortion detection unit 480 determines that the rectified voltage 413 (e.g., VIN) is not distorted if the determined downward slope is not larger than the predetermined slope threshold in magnitude (e.g., if the absolute value of the determined downward slope is not larger than the absolute value of the predetermined slope threshold). In certain examples, if the rectified voltage (e.g., VIN) is determined to be distorted, the processes 631, 632 and 640 are performed, and if the rectified voltage (e.g., VIN) is determined to be not distorted, the processes 650 and 660 are performed.

At the process 631, the phase range within which the TRIAC dimmer is in the conduction state is detected according to some embodiments. In certain examples, the phase detection sub-unit 442 receives the sensing signal 431 (e.g., LS) and detects, based on at least information associated with the sensing signal 431 (e.g., LS), a phase range within which the TRIAC dimmer 410 is in the conduction state. For example, the phase detection sub-unit 442 also generates the phase range signal 443 that indicates the detected phase range within which the TRIAC dimmer 410 is in the conduction state.

At the process 632, the phase compensation is performed to determine the compensated phase range within which the TRIAC dimmer is in the conduction state according to certain embodiments. In some examples, the phase compensation sub-unit 444 receives the phase range signal 443 and the distortion detection signal 481. For example, the distortion detection signal 481 indicates that the rectified voltage 413 (e.g., VIN) is distorted, so the phase compensation sub-unit 444 performs the phase compensation to the detected phase range within which the TRIAC dimmer 410 is in the conduction state as indicated by the phase range signal 443. As an example, the compensation to the detected phase range within which the TRIAC dimmer 410 is in the conduction state is larger than zero in magnitude, and is performed to compensate for the reduction of the phase range caused by the distortion of the rectified voltage 413 (e.g., VIN).

At the process 640, brightness of the LEDs are adjusted based at least in part on the compensated phase range within which the TRIAC dimmer is in the conduction state according to some embodiments. In certain examples, the phase compensation sub-unit 444 uses the compensated phase range to generate the reference voltage 445 (e.g., Vref1) and outputs the reference voltage 445 (e.g., Vref1) to the control unit 460 (e.g., U1) for LED output current. For example, the control unit 460 (e.g., U1) for LED output current receives the reference voltage 445 (e.g., Vref1), and uses the reference voltage 445 (e.g., Vref1) to adjust the output current 421 that flows through the one or more LEDs 420 and also adjust brightness of the one or more LEDs 420.

At the process 650, the uncompensated phase range within which the TRIAC dimmer is in the conduction state is determined according to certain embodiments. In some examples, the phase detection sub-unit 442 receives the sensing signal 431 (e.g., LS) and detects, based on at least information associated with the sensing signal 431 (e.g., LS), a phase range within which the TRIAC dimmer 410 is in the conduction state. For example, the phase detection sub-unit 442 also generates the phase range signal 443 that indicates the detected phase range within which the TRIAC dimmer 410 is in the conduction state. As an example, the detected phase range is the uncompensated phase range.

In certain examples, the phase compensation sub-unit 444 receives the phase range signal 443 and the distortion detection signal 481. For example, the distortion detection signal 481 indicates that the rectified voltage 413 (e.g., VIN) is not distorted, so the phase compensation sub-unit 444 performs a phase compensation that is equal to zero in magnitude to the detected phase range so that the compensated phase range is the same as the uncompensated phase range, and uses this compensated phase range as the uncompensated phase range within which the TRIAC dimmer 410 is in the conduction state.

At the process 660, brightness of the LEDs are adjusted based at least in part on the uncompensated phase range within which the TRIAC dimmer is in the conduction state according to certain embodiments. In some examples, the phase compensation sub-unit 444 uses the uncompensated phase range to generate the reference voltage 445 (e.g., Vref1) and outputs the reference voltage 445 (e.g., Vref1) to the control unit 460 (e.g., U1) for LED output current. For example, the control unit 460 (e.g., U1) for LED output current receives the reference voltage 445 (e.g., Vref1), and uses the reference voltage 445 (e.g., Vref1) to adjust the output current 421 that flows through the one or more LEDs 420 and also adjust brightness of the one or more LEDs 420.

As discussed above and further emphasized here, FIG. 6 is merely an example, which should not unduly limit the scope of the claims. One of ordinary skill in the art would recognize many variations, alternatives, and modifications. For example, regardless of whether the rectified voltage (e.g., the rectified voltage 413) is distorted or not, when the detected output current that flows through the one or more LEDs (e.g., the detected output current 421 that flows through the one or more LEDs 420) falls below a predetermined current threshold, after a predetermined delay, the bleeder current (e.g., the bleeder current 471) is generated to ensure that the current flowing through the TRIAC dimmer (e.g., the TRIAC dimmer 410) does not fall below the holding current of the TRIAC dimmer (e.g., the TRIAC dimmer 410). For example, the predetermined delay is larger than zero.

FIG. 7 shows simplified timing diagrams for the LED lighting system 400 using the TRIAC dimmer 410 as shown in FIG. 4 according to certain embodiments of the present invention. These diagrams are merely examples, which should not unduly limit the scope of the claims. One of ordinary skill in the art would recognize many variations, alternatives, and modifications. As shown in FIG. 7, the waveform 710 represents the rectified voltage 413 (e.g., VIN) as a function of time, the waveform 720 represents the output current 421 (e.g., $I_{led}$) flowing through the one or more LEDs 420 as a function of time, and the waveform 730 represents the bleeder current 471 (e.g., $I_{bleed}$) that is generated with a predetermined delay as a function of time. For example, the waveforms 710, 720, and 730 show one or more processes of the method 500 as shown in FIG. 5. As an example, the waveforms 710, 720, and 730 show one or more processes of the method 600 as shown in FIG. 6.

In some examples, as shown by the waveforms 710 and 720, when the rectified voltage 413 (e.g., VIN) becomes larger than a forward bias voltage 716 (e.g., VO) of the one or more LEDs 420, the output current 421 (e.g., $I_{led}$) flowing through the one or more LEDs 420 rises from zero to a magnitude 724 that is larger than zero, but when the rectified voltage (e.g., VIN) becomes smaller than the forward bias voltage 716 (e.g., VO) of the one or more LEDs 420, the output current 421 (e.g., $I_{led}$) flowing through the one or more LEDs 420 drops from the magnitude 724 to zero. In certain examples, as shown by the waveforms 720 and 730, after the output current 421 (e.g., $I_{led}$) flowing through the one or more LEDs 420 becomes smaller than the holding current of the TRIAC dimmer 410, with the predetermined delay (e.g., $T_{delay}$), the bleeder unit 470 generates the bleeder current 471 so that the total current that flows through the TRIAC dimmer 410 becomes larger than the holding current of the TRIAC dimmer 410. For example, the predetermined delay is larger than zero.

Referring to FIG. 7, the control mechanism for the bleeder current 471 as implemented by the LED lighting system 400 causes distortion of the rectified voltage 413 (e.g., VIN) according to some embodiments. In certain examples, such distortion of the rectified voltage 413 (e.g., VIN) affects the detection of the phase range within which the TRIAC dimmer 410 is in the conduction state. For example, such distortion of the rectified voltage (e.g., VIN) makes the detected phase range smaller than the actual phase range within which the TRIAC dimmer 410 is in the conduction state.

As shown by the waveform 710, during the predetermined delay (e.g., $T_{delay}$), the bleeder current 471 remains equal to zero in magnitude, so the total current that flows through the TRIAC dimmer 410 is smaller than the holding current of the TRIAC dimmer 410 according to certain embodiments. In some examples, during the predetermined delay (e.g., $T_{delay}$), the TRIAC dimmer 410 cannot sustain the linear operation, causing the distortion of the rectified voltage 413 (e.g., VIN). For example, the waveform 710 includes a segment 712, but the segment 712 deviates from a segment 714 as shown in FIG. 7. In certain examples, this deviation of the segment 712 from the segment 714 shows the distortion of the rectified voltage (e.g., VIN), and this distortion causes the detected phase range within which the TRIAC dimmer 410 is in the conduction state to be inaccurate. As an example, with the distortion, the detected phase range within which the TRIAC dimmer 410 is in the conduction state is equal to $\phi1$; in contrast, without the distortion, the detected phase range within which the TRIAC dimmer 410 is in the conduction state is equal to $\phi2$, wherein $\phi1$ is smaller than $\phi2$ by $\Delta\phi$.

In some embodiments, the phase detection sub-unit 442 receives the sensing signal 431 (e.g., LS) and detects, based on at least information associated with the sensing signal 431 (e.g., LS), the phase range within which the TRIAC dimmer 410 is in a conduction state. For example, the phase range detected by the phase detection sub-unit 442 is equal to $\phi1$. As an example, the phase detection sub-unit 442 also generates a phase range signal 443 that indicates the detected phase range $\phi1$ within which the TRIAC dimmer 410 is in the conduction state.

In certain embodiments, if the TRIAC dimmer 410 is a leading-edge TRIAC dimmer, the voltage distortion detection unit 480 compares the determined downward slope of the segment 712 of the waveform 710 with the predetermined slope threshold, and determines whether the rectified voltage 413 (e.g., VIN) is distorted based at least in part on the comparison between the determined downward slope and the predetermined slope threshold. For example, the TRIAC dimmer 410 is a leading-edge TRIAC dimmer and the determined downward slope of the segment 712 of the waveform 710 is larger than the predetermined slope threshold in magnitude (e.g., the absolute value of the determined downward slope is larger than the absolute value of the predetermined slope threshold), so the voltage distortion detection unit 480 determines that the rectified voltage 413 (e.g., VIN) is distorted.

According to some embodiments, the phase compensation sub-unit 444 receives the phase range signal 443 and the distortion detection signal 481 and generates the reference voltage 445 (e.g., Vref1) based at least in part on the phase range signal 443 and the distortion detection signal 481. In some examples, the distortion detection signal 481 indicates that the rectified voltage 413 (e.g., VIN) is distorted, so the phase compensation sub-unit 444 performs a phase compensation to the detected phase range φ1 within which the TRIAC dimmer 410 is in the conduction state as indicated by the phase range signal 443.

According to certain embodiments, the phase compensation is performed by adding Δφ that is larger than zero to the detected phase range φ1, so that the compensated phase range is equal to φ2 as shown in FIG. 7. As an example, $$\phi_1 + \Delta\phi = \phi_2 \qquad \text{(Equation 1)}$$

In some examples, the phase compensation Δφ is predetermined. For example, the phase compensation Δφ is predetermined by measurement for a TRIAC dimmer that is of the same type as the TRIAC dimmer 410. In certain examples, the phase compensation Δφ is larger than 0. As an example, the phase compensation Δφ is equal to 30°.

In certain examples, the phase compensation sub-unit 444 uses the compensated phase range φ2 to generate the reference voltage 445 (e.g., Vref1). As an example, the control unit 460 (e.g., U1) for LED output current receives the reference voltage 445 (e.g., Vref1) and uses the reference voltage 445 (e.g., Vref1) to adjust the output current 421 that flows through the one or more LEDs 420 and also adjust brightness of the one or more LEDs 420.

Referring to FIG. 7, without the distortion, the detected phase range within which the TRIAC dimmer 410 is in the conduction state is equal to φ2 according to some embodiments. In certain examples, without the distortion, the phase range φ2 varies between a magnitude φA and a magnitude φB. For example, without the distortion, if the phase range φ2 is equal to the magnitude φA, the one or more LEDs 420 is at 0% of the full brightness. As an example, without the distortion, if the phase range φ2 is equal to the magnitude φB, the one or more LEDs 420 is at 100% of the full brightness. According to certain embodiments, with the distortion, the detected phase range within which the TRIAC dimmer 410 is in the conduction state is equal to φ1. In some examples, with the distortion, the phase range φ1 varies between a magnitude equal to φA-Δφ and a magnitude equal to φB-Δφ. For example, with the distortion, if the phase range φ1 is equal to the magnitude φA-Δφ, the one or more LEDs 420 is at 0% of the full brightness. As an example, with the distortion, if the phase range φ1 is equal to the magnitude φB-Δφ, the one or more LEDs 420 is at η % of the full brightness, where η % is less than 80%.

According to certain embodiments, as shown by Equation 1, with the distortion, the compensated phase range varies between the magnitude φA and the magnitude φB. For example, with the distortion, if the compensated phase range is equal to the magnitude φA, the one or more LEDs 420 is at 0% of the full brightness. As an example, with the distortion, if the compensated phase range is equal to the magnitude φ3, the one or more LEDs 420 is at 100% of the full brightness.

In some embodiments, at time $t_a$, the rectified voltage 413 (e.g., VIN) becomes larger than the forward bias voltage (e.g., VO) of the one or more LEDs 420 as shown by the waveform 710, the detected output current 421 (e.g., $I_{led}$) rises above the predetermined current threshold 722 as shown by the waveform 720, and the bleeder current 471 drops from the predetermined magnitude 734 to the predetermined magnitude 736 as shown by the waveform 730. For example, the predetermined magnitude 736 is equal to zero. As an example, from time $t_a$ to time $t_b$, the bleeder current 471 is not generated.

In certain embodiments, at time $t_b$, the rectified voltage 413 (e.g., VIN) becomes smaller than the forward bias voltage (e.g., VO) of the one or more LEDs 420 as shown by the waveform 710, the detected output current 421 (e.g., $I_{led}$) falls below the predetermined current threshold 722 as shown by the waveform 720, and the bleeder current 471 remains at the predetermined magnitude 736 as shown by the waveform 730. For example, the predetermined magnitude 736 is equal to zero. As an example, from time $t_b$ to time $t_c$, the bleeder current 471 is still not generated, wherein the time duration from time $t_b$ to time $t_c$ is the predetermined delay $T_{delay}$.

According to some embodiments, at time $t_c$, the bleeder current 471 increases from the predetermined magnitude 736 to the predetermined magnitude 734. For example, the predetermined magnitude 736 is equal to zero, and the predetermined magnitude 734 is larger than zero. In certain examples, from time $t_c$ to time $t_d$, the bleeder current 471 remains at the predetermined magnitude 734. As an example, the bleeder current 471 generated at the predetermined magnitude 734 is used to ensure that the current flowing through the TRIAC dimmer 410 does not fall below the holding current of the TRIAC dimmer 410.

According to certain embodiments, at time $t_d$, the rectified voltage 413 (e.g., VIN) becomes larger than the forward bias voltage (e.g., VO) of the one or more LEDs 420 as shown by the waveform 710, the detected output current 421 (e.g., $I_{led}$) rises above the predetermined current threshold 722 as shown by the waveform 720, and the bleeder current 471 drops from the predetermined magnitude 734 to the predetermined magnitude 736 as shown by the waveform 730. For example, the predetermined magnitude 736 is equal to zero. As an example, at time $t_d$, the bleeder current 471 stops being generated.

As discussed above and further emphasized here, FIG. 4, FIG. 5, FIG. 6 and FIG. 7 are merely examples, which should not unduly limit the scope of the claims. One of ordinary skill in the art would recognize many variations, alternatives, and modifications. In certain embodiments, the bleeder current control unit 450 also receives the sensing signal 431 (e.g., LS) and determines whether the rectified voltage 413 (e.g., VIN) becomes smaller than a threshold voltage that is smaller than the forward bias voltage 716 (e.g., VO) of the one or more LEDs 420. As an example, the threshold voltage is smaller than the forward bias voltage 716 (e.g., VO) of the one or more LEDs 420 and also is larger than but close to zero volts. For example, when the rectified voltage 413 (e.g., VIN) becomes smaller than the threshold voltage, without delay, the control signal 451 immediately changes from the logic low level to the logic high level so that the switch 476 changes from being open to being closed so that the bleeder current 471 is generated at the predetermined magnitude (e.g., at time $t_c$, increases from the predetermined magnitude 736 to the predetermined magnitude 734 as shown by the waveform 730 in FIG. 7). As an example, time $t_c$ follows time $t_b$ by the time duration $T_{delay}$.

Figure 8:
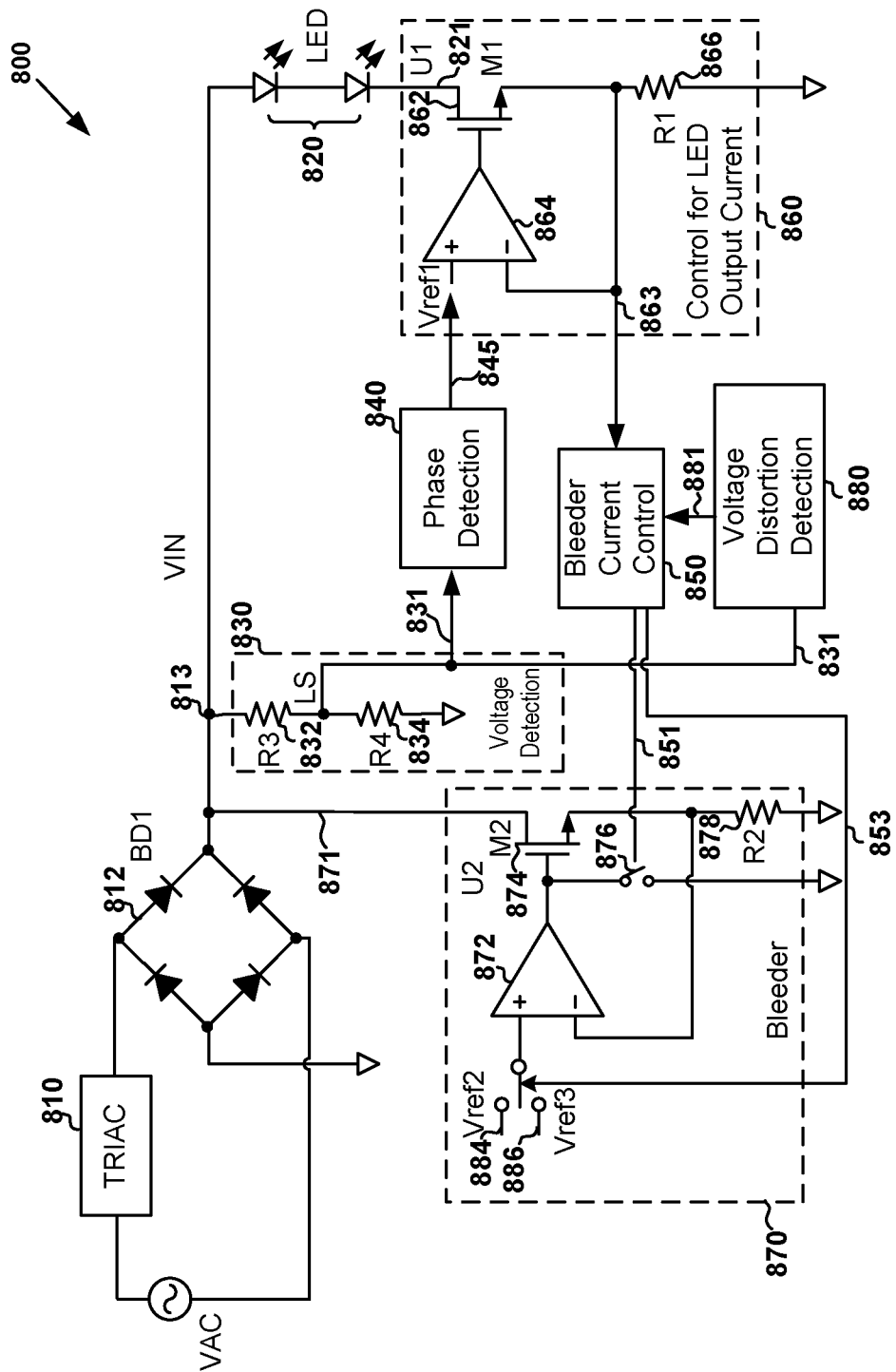
FIG. 8 is a circuit diagram showing an LED lighting system using a TRIAC dimmer according to certain embodiments of the present invention.

FIG. 8 is a circuit diagram showing an LED lighting system using a TRIAC dimmer according to certain embodiments of the present invention. This diagram is merely an example, which should not unduly limit the scope of the claims. One of ordinary skill in the art would recognize many variations, alternatives, and modifications. As shown in FIG. 8, the LED lighting system 800 includes a TRIAC dimmer 810, a rectifier 812 (e.g., BD1), one or more LEDs 820, a control unit 860 (e.g., U1) for LED output current, a bleeder unit 870 (e.g., U2), and a dimming control system according to certain embodiments. In some examples, the dimming control system includes a voltage detection unit 830, a phase detection unit 840, a bleeder current control unit 850, and a voltage distortion detection unit 880. Although the above has been shown using a selected group of components for the LED lighting system, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In certain embodiments, after the system 800 is powered on, an AC input voltage (e.g., VAC) is received by the TRIAC dimmer 810 and rectified by the rectifier 812 (e.g., BD1) to generate a rectified voltage 813 (e.g., VIN). For example, the rectified voltage 813 (e.g., VIN) is used to control an output current 821 that flows through the one or more LEDs 820. In some embodiments, the rectified voltage 813 (e.g., VIN) is received by the voltage detection unit 830, which in response outputs a sensing signal 831 (e.g., LS) to the phase detection unit 840 and the voltage distortion detection unit 880. For example, the voltage detection unit 830 includes a resistor 832 (e.g., R3) and a resistor 834 (e.g., R4), and the resistors 832 and 834 form a voltage divider. As an example, the voltage detection unit 830 also includes a sampling circuit, which is configured to sample a processed voltage that is generated by the voltage divider and to generate the sensing signal 831 (e.g., LS) that represents a change of the rectified voltage 813 (e.g., VIN).

According to certain embodiments, the voltage distortion detection unit 880 receives the sensing signal 831 (e.g., LS), determines whether the rectified voltage 813 (e.g., VIN) is distorted or not based at least in part on the sensing signal 831 (e.g., LS), and generates a distortion detection signal 881 that indicates whether the rectified voltage 813 (e.g., VIN) is distorted or not. In some examples, if the TRIAC dimmer 810 is a leading-edge TRIAC dimmer, the voltage distortion detection unit 880 uses the sensing signal 831 (e.g., LS) to determine the downward slope of the falling edge of the rectified voltage 813 (e.g., VIN) and determines whether the rectified voltage 813 (e.g., VIN) is distorted based at least in part on the determined downward slope. For example, whether the TRIAC dimmer 810 is a leading-edge TRIAC dimmer is detected by the LED lighting system 800 or is predetermined.

In certain examples, if the TRIAC dimmer 810 is a leading-edge TRIAC dimmer, the voltage distortion detection unit 880 compares the determined downward slope with a predetermined slope threshold and determines whether the rectified voltage 813 (e.g., VIN) is distorted based at least in part on the comparison between the determined downward slope and the predetermined slope threshold. For example, if the TRIAC dimmer 810 is a leading-edge TRIAC dimmer, the voltage distortion detection unit 880 determines that the rectified voltage 813 (e.g., VIN) is distorted if the determined downward slope is larger than the predetermined slope threshold in magnitude (e.g., if the absolute value of the determined downward slope is larger than the absolute value of the predetermined slope threshold). As an example, if the TRIAC dimmer 810 is a leading-edge TRIAC dimmer, the voltage distortion detection unit 880 determines that the rectified voltage 813 (e.g., VIN) is not distorted if the determined downward slope is not larger than the predetermined slope threshold in magnitude (e.g., if the absolute value of the determined downward slope is not larger than the absolute value of the predetermined slope threshold).

According to some embodiments, the phase detection unit 840 receives the sensing signal 831 (e.g., LS) and detects, based on at least information associated with the sensing signal 831 (e.g., LS), a phase range within which the TRIAC dimmer 810 is in a conduction state. In certain examples, the phase detection unit 840 also generates a reference voltage 845 (e.g., Vref1) based at least in part on the detected phase range within which the TRIAC dimmer 810 is in the conduction state.

In certain embodiments, the control unit 860 (e.g., U1) for LED output current receives the reference voltage 845 (e.g., Vref1) and uses the reference voltage 845 (e.g., Vref1) to control the output current 821 that flows through the one or more LEDs 820. In some embodiments, the control unit 860 (e.g., U1) for LED output current includes a transistor 862, an amplifier 864, and a resistor 866. In certain examples, the amplifier 864 includes a positive input terminal (e.g., the "+" input terminal), a negative input terminal (e.g., the "−" input terminal), and an output terminal. For example, the positive input terminal (e.g., the "+" input terminal) of the amplifier 864 receives the reference voltage 845 (e.g., Vref1), the negative input terminal (e.g., the "−" input terminal) of the amplifier 864 is coupled to the source terminal of the transistor 862, and the output terminal of the amplifier 864 is coupled to the gate terminal of the transistor 862. As an example, the drain terminal of the transistor 862 is coupled to the one or more LEDs 820. In some examples, the negative input terminal (e.g., the "−" input terminal) of the amplifier 864 is also coupled to one terminal of the resistor 866 to generate a sensing signal 863, which is proportional to the output current 821 that flows through the one or more LEDs 820. For example, the resistor 866 includes another terminal biased to the ground voltage. As an example, the sensing signal 863 is outputted to the bleeder current control unit 850.

Figure 10:
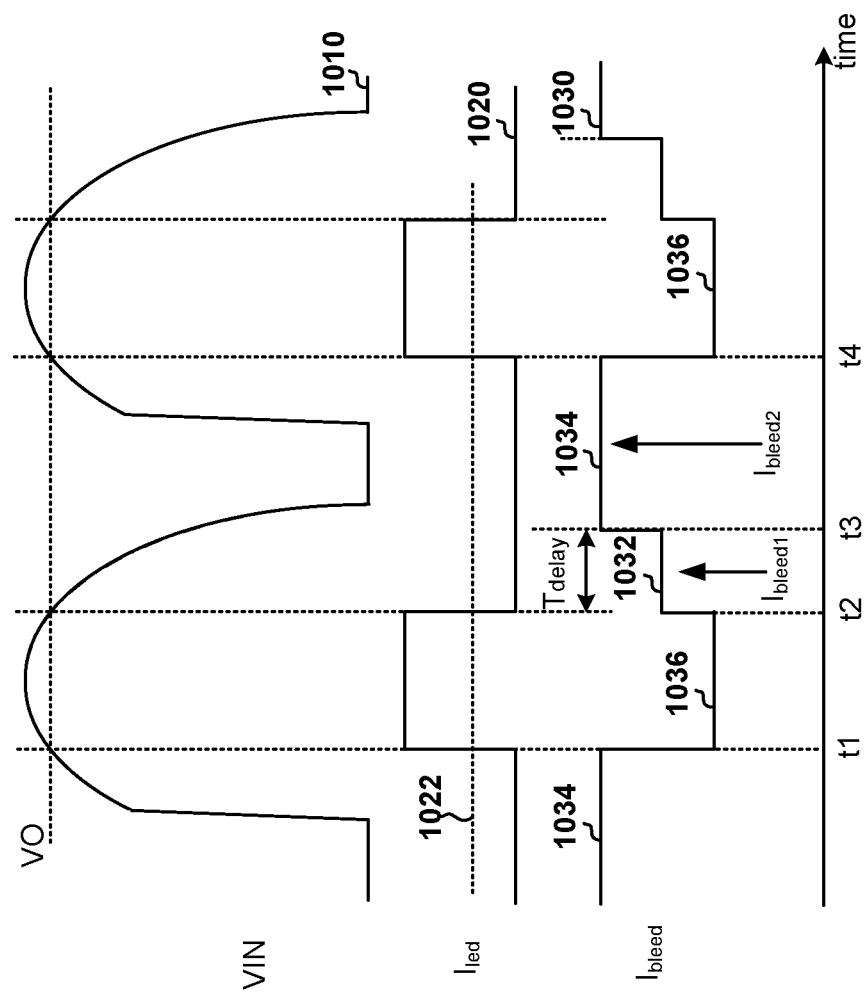
FIG. 10 shows simplified timing diagrams for the LED lighting system using the TRIAC dimmer as shown in FIG. 8 according to certain embodiments of the present invention.

In some embodiments, the bleeder current control unit 850 receives the distortion detection signal 881 and the sensing signal 863, and in response generates control signals 851 and 853. In certain examples, the bleeder unit 870 (e.g., U2) includes a transistor 874, an amplifier 872, a resistor 878, and switches 878 and 882. In some examples, if the distortion detection signal 881 indicates that the rectified voltage 813 (e.g., VIN) is distorted, the process 931 is performed. For example, when the sensing signal 863 rises above a predetermined voltage threshold (e.g., at time $t_1$ when the detected output current 821 rises above the predetermined current threshold 1022 as shown by the waveform 1020 in FIG. 10), the control signal 851 changes from the logic high level to the logic low level so that the switch 876 changes from being closed to being open so that the bleeder current 871 is drops to zero (e.g., the predetermined magnitude 1036 as shown by the waveform 1030 in FIG. 10), indicating that the bleeder current 871 is not generated. As an example, when the sensing signal 863 falls below the predetermined voltage threshold (e.g., at time $t_2$ when the detected output current 821 falls below the predetermined current threshold 1022 as shown by the waveform 1020 in FIG. 10), immediately the control signal 851 changes from the logic low level to the logic high level so that the switch 876 changes from being open to being closed, and immediately the control signal 853 is generated at a first logic level (e.g., a logic low level) to make the positive terminal (e.g., the "+" terminal) of the amplifier 872 biased to a voltage 884 (e.g., $V_{ref2}$), so that the bleeder current 871 is generated at a predetermined magnitude (e.g., the predetermined magnitude 1032, such as $I_{bleed1}$, as shown by the waveform 1030 in FIG. 10) without any predetermined delay. For example, after the predetermined delay (e.g., after the time duration $T_{delay}$ from time $t_2$ to time $t_3$ as shown in FIG. 10), the control signal 853 changes from the first logic level (e.g., the logic low level) to a second logic level (e.g., the logic high level) to make the positive terminal (e.g., the "+" terminal) of the amplifier 872 biased to a voltage 886 (e.g., $V_{ref3}$), so that the bleeder current 871 increases from the predetermined magnitude to another predetermined magnitude (e.g., at time $t_3$, increases from the predetermined magnitude 1032 to the predetermined magnitude 1034, such as $I_{bleed2}$, as shown by the waveform 1030 in FIG. 10). As an example, the predetermined delay is larger than zero. For example, when the sensing signal 863 rises above the predetermined voltage threshold (e.g., at time $t_4$ when the detected output current 821 rises above the predetermined current threshold 1022 as shown by the waveform 1020 in FIG. 10), the control signal 851 changes from the logic high level to the logic low level so that the switch 876 changes from being closed to being open and the bleeder current 871 drops from the another predetermined magnitude to zero (e.g., at time $t_4$, drops from the predetermined magnitude 1034 to zero as shown by the waveform 1030 in FIG. 10), indicating that the bleeder current 871 is not generated.

In certain examples, if the distortion detection signal 881 indicates that the rectified voltage 813 (e.g., VIN) is not distorted, the process 931 is not performed. For example, when the sensing signal 863 rises above a predetermined voltage threshold (e.g., at time $t_1$ when the detected output current 821 rises above the predetermined current threshold 1022 as shown by the waveform 1020 in FIG. 10), the control signal 851 changes from the logic high level to the logic low level so that the switch 876 changes from being closed to being open so that the bleeder current 871 is equal to zero, indicating that the bleeder current 871 is not generated. As an example, when the sensing signal 863 falls below the predetermined voltage threshold (e.g., at time $t_2$ when the detected output current 821 falls below the predetermined current threshold 1022 as shown by the waveform 1020 in FIG. 10), the control signal 851 does not changes from the logic low level to the logic high level so that the switch 876 remains open and the bleeder current 871 remains equal to zero, indicating that the bleeder current 871 remains not generated. For example, after the predetermined delay (e.g., after the time duration $T_{delay}$ from time $t_2$ to time $t_3$ as shown in FIG. 10), the control signal 851 changes from the logic low level to the logic high level so that the switch 876 changes from being open to being closed and the control signal 853 is generated at the second logic level (e.g., the logic high level) to make the positive terminal (e.g., the "+" terminal) of the amplifier 872 biased to the voltage 886 (e.g., $V_{ref3}$), so that the bleeder current 871 is generated at a predetermined magnitude (e.g., the predetermined magnitude 1032 as shown in FIG. 10). As an example, when the sensing signal 863 rises above the predetermined voltage threshold (e.g., at time $t_4$ when the detected output current 821 rises above the predetermined current threshold 1022 as shown by the waveform 1020 in FIG. 10), the control signal 851 changes from the logic high level to the logic low level so that the switch 876 changes from being closed to being open and the bleeder current 871 drops from the predetermined magnitude to zero (e.g., at time $t_4$, drops from the predetermined magnitude 1034 to zero as shown in FIG. 10), indicating that the bleeder current 871 is not generated.

According to certain embodiments, the phase detection unit 840 receives the sensing signal 831 (e.g., LS) and detects, based on at least information associated with the sensing signal 831 (e.g., LS), a phase range within which the TRIAC dimmer 810 is in a conduction state. For example, the phase detection unit 840 generates a reference voltage 845 (e.g., Vref1) based at least in part on the detected phase range within which the TRIAC dimmer 810 is in the conduction state. As an example, the reference voltage 845 (e.g., Vref1) is received by the control unit 860 (e.g., U1) for LED output current.

Figure 9:
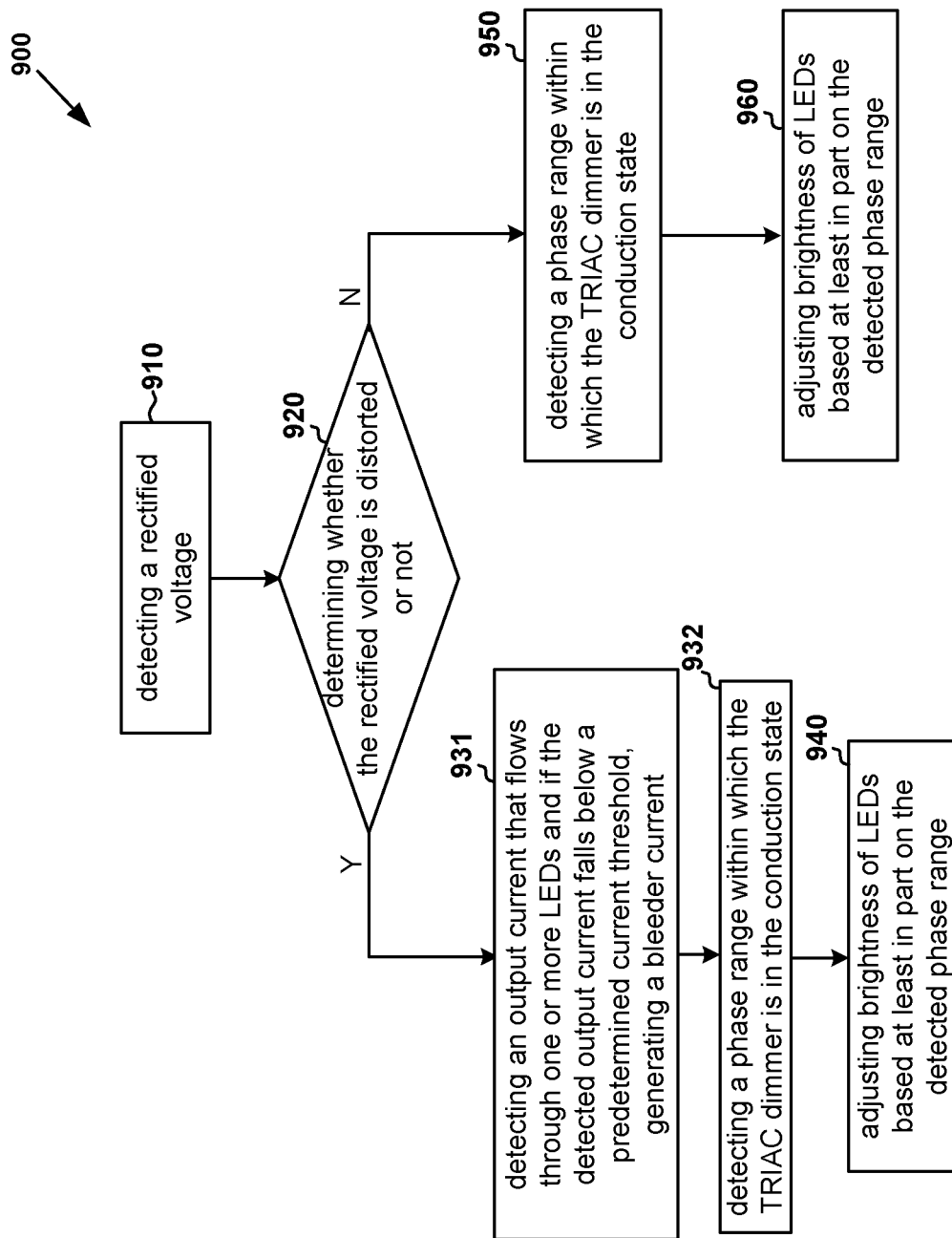
FIG. 9 is a diagram showing a method for the LED lighting system using the TRIAC dimmer as shown in FIG. 8 according to some embodiments of the present invention.

FIG. 9 is a diagram showing a method for the LED lighting system 800 using the TRIAC dimmer 810 as shown in FIG. 8 according to some embodiments of the present invention. This diagram is merely an example, which should not unduly limit the scope of the claims. One of ordinary skill in the art would recognize many variations, alternatives, and modifications. The method 900 includes a process 910 for detecting a rectified voltage (e.g., VIN), a process 920 for determining whether the rectified voltage (e.g., VIN) is distorted or not, a process 931 for detecting an output current that flows through one or more LEDs and if the detected output current falls below a predetermined current threshold, generating a bleeder current, a process 932 for detecting a phase range within which the TRIAC dimmer is in the conduction state, a process 940 for adjusting brightness of LEDs based at least in part on the detected phase range, a process 950 for detecting a phase range within which the TRIAC dimmer is in the conduction state, and a process 960 for adjusting brightness of LEDs based at least in part on the detected phase range.

At the process 910, the rectified voltage (e.g., VIN) (e.g., the rectified voltage 813) is detected according to some embodiments. In certain examples, the rectified voltage 813 (e.g., VIN) is received by the voltage detection unit 830, which in response detects the rectified voltage 813 (e.g., VIN) and outputs the sensing signal 831 (e.g., LS) to the phase detection unit 840 and the voltage distortion detection unit 880. For example, the sensing signal 831 (e.g., LS) represents the magnitude of the rectified voltage 813 (e.g., VIN). In some examples, the voltage detection unit 830 includes the voltage divider and the sampling circuit. For example, the voltage divider includes the resistor 832 (e.g., R3) and the resistor 834 (e.g., R4), and is configured to receive the rectified voltage 813 (e.g., VIN) and generate the processed voltage. As an example, the sampling circuit samples the processed voltage that is generated by the voltage divider and generates the sensing signal 831 (e.g., LS) that represents the change of the rectified voltage 813 (e.g., VIN).

At the process 920, whether the rectified voltage (e.g., VIN) is distorted or not is determined according to certain embodiments. In some examples, the voltage distortion detection unit 880 receives the sensing signal 831 (e.g., LS), determines whether the rectified voltage 813 (e.g., VIN) is distorted or not based at least in part on the sensing signal 831 (e.g., LS), and generates a distortion detection signal 881 that indicates whether the rectified voltage 813 (e.g., VIN) is distorted or not. In certain examples, if the TRIAC dimmer 810 is a leading-edge TRIAC dimmer, the voltage distortion detection unit 880 uses the sensing signal 831 (e.g., LS) to determine the downward slope of the falling edge of the rectified voltage 813 (e.g., VIN) and determines whether the rectified voltage 813 (e.g., VIN) is distorted based at least in part on the determined downward slope. For example, whether the TRIAC dimmer 810 is a leading-edge TRIAC dimmer is detected by the LED lighting system 800 or is predetermined.

In some examples, if the TRIAC dimmer 810 is a leading-edge TRIAC dimmer, the voltage distortion detection unit 880 compares the determined downward slope with a predetermined slope threshold and determines whether the rectified voltage 813 (e.g., VIN) is distorted based at least in part on the comparison between the determined downward slope and the predetermined slope threshold. For example, if the TRIAC dimmer 810 is a leading-edge TRIAC dimmer, the voltage distortion detection unit 880 determines that the rectified voltage 813 (e.g., VIN) is distorted if the determined downward slope is larger than the predetermined slope threshold in magnitude (e.g., if the absolute value of the determined downward slope is larger than the absolute value of the predetermined slope threshold). As an example, if the TRIAC dimmer 810 is a leading-edge TRIAC dimmer, the voltage distortion detection unit 880 determines that the rectified voltage 813 (e.g., VIN) is not distorted if the determined downward slope is not larger than the predetermined slope threshold in magnitude (e.g., if the absolute value of the determined downward slope is not larger than the absolute value of the predetermined slope threshold).

In some embodiments, if the rectified voltage (e.g., VIN) is determined to be distorted during one or more earlier cycles of the rectified voltage (e.g., VIN), the processes 931, 932 and 940 are performed for one or more later cycles of the rectified voltage (e.g., VIN). In certain embodiments, if the rectified voltage (e.g., VIN) is determined to be not distorted during one or more earlier cycles of the rectified voltage (e.g., VIN), the processes 950 and 960 are performed for one or more later cycles of the rectified voltage (e.g., VIN).

At the process 931, the output current that flows through the one or more LEDs is detected, and if the detected output current falls below the predetermined current threshold, the bleeder current is generated according to some embodiments. In certain examples, when the detected output current falls below the predetermined current threshold, the bleeder current is generated at a first predetermined magnitude without any predetermined delay, and then after a predetermined delay, the bleeder current changes from the first predetermined magnitude to the second predetermined magnitude. For example, the predetermined delay is larger than zero. In some examples, the first predetermined magnitude is smaller than the second predetermined magnitude. For example, the bleeder current (e.g., the bleeder current 871) at the first predetermined magnitude is used to prevent the distortion of the rectified voltage (e.g., the distortion of the rectified voltage 813). As an example, the bleeder current (e.g., the bleeder current 871) at the second predetermined magnitude is used to ensure that the current flowing through the TRIAC dimmer (e.g., the TRIAC dimmer 810) does not fall below the holding current of the TRIAC dimmer (e.g., the TRIAC dimmer 810). For example, after the process 931, the process 932 is performed.

At the process 932, the phase range within which the TRIAC dimmer is in the conduction state is detected according to certain embodiments. In some examples, the phase detection unit 840 receives the sensing signal 831 (e.g., LS) and detects, based on at least information associated with the sensing signal 831 (e.g., LS), a phase range within which the TRIAC dimmer 810 is in the conduction state. In certain examples, after the process 932, the process 940 is performed.

At the process 940, brightness of the LEDs are adjusted based at least in part on the detected phase range within which the TRIAC dimmer is in the conduction state according to some embodiments. In certain examples, the phase detection unit 840 uses the detected phase range to generate the reference voltage 845 (e.g., Vref1) and outputs the reference voltage 845 (e.g., Vref1) to the control unit 860 (e.g., U1) for LED output current. For example, the control unit 860 (e.g., U1) for LED output current receives the reference voltage 845 (e.g., Vref1), and uses the reference voltage 845 (e.g., Vref1) to adjust the output current 821 that flows through the one or more LEDs 820 and also adjust brightness of the one or more LEDs 820.

At the process 950, the phase range within which the TRIAC dimmer is in the conduction state is detected according to certain embodiments. In some examples, the phase detection unit 840 receives the sensing signal 831 (e.g., LS) and detects, based on at least information associated with the sensing signal 831 (e.g., LS), a phase range within which the TRIAC dimmer 810 is in the conduction state. In certain examples, after the process 950, the process 960 is performed.

At the process 960, brightness of the LEDs are adjusted based at least in part on the detected phase range within which the TRIAC dimmer is in the conduction state according to some embodiments. In certain examples, the phase detection unit 840 uses the detected phase range to generate the reference voltage 845 (e.g., Vref1) and outputs the reference voltage 845 (e.g., Vref1) to the control unit 860 (e.g., U1) for LED output current. For example, the control unit 860 (e.g., U1) for LED output current receives the reference voltage 845 (e.g., Vref1), and uses the reference voltage 845 (e.g., Vref1) to adjust the output current 821 that flows through the one or more LEDs 820 and also adjust brightness of the one or more LEDs 820.

As discussed above and further emphasized here, FIG. 9 is merely an example, which should not unduly limit the scope of the claims. One of ordinary skill in the art would recognize many variations, alternatives, and modifications. For example, if the rectified voltage (e.g., the rectified voltage 813) is determined to be not distorted at the process 920, when the detected output current that flows through the one or more LEDs falls below the predetermined current threshold (e.g., at time $t_2$, the detected output current 821 that flows through the one or more LEDs 820 falls below the predetermined current threshold 1022), after the predetermined delay (e.g., $T_{delay}$), the control signal 851 changes from the logic low level to the logic high level so that the switch 876 changes from being open to being closed and the control signal 853 is generated at the second logic level (e.g., the logic high level) to make the positive terminal (e.g., the "+" terminal) of the amplifier 872 biased to the voltage 886 (e.g., $V_{ref3}$), so that the bleeder current is generated at a predetermined magnitude (e.g., at time $t_4$, the bleeder current 871 is generated at the predetermined magnitude 1034) to ensure that the current flowing through the TRIAC dimmer (e.g., the TRIAC dimmer 810) does not fall below the holding current of the TRIAC dimmer (e.g., the TRIAC dimmer 810).

FIG. 10 shows simplified timing diagrams for the LED lighting system 800 using the TRIAC dimmer 810 as shown in FIG. 8 according to certain embodiments of the present invention. These diagrams are merely examples, which should not unduly limit the scope of the claims. One of ordinary skill in the art would recognize many variations, alternatives, and modifications. As shown in FIG. 10, the waveform 1010 represents the rectified voltage 813 (e.g., VIN) as a function of time, the waveform 1020 represents the output current 821 (e.g., I$_{led}$) flowing through the one or more LEDs 820 as a function of time, and the waveform 1030 represents the bleeder current 871 (e.g., I$_{bleed}$) as a function of time. For example, the waveforms 1010, 1020, and 1030 show one or more processes of the method 900 as shown in FIG. 9.

In certain embodiments, after the rectified voltage 813 (e.g., VIN) is determined to be distorted during one or more earlier cycles of the rectified voltage 813 (e.g., VIN) at the process 920, the processes 931, 932 and 940 are then performed for one or more later cycles of the rectified voltage 813 (e.g., VIN).

In some embodiments, at time t$^1$, the rectified voltage 813 (e.g., VIN) becomes larger than the forward bias voltage (e.g., VO) of the one or more LEDs 820 as shown by the waveform 1010, the detected output current 821 (e.g., I$_{led}$) rises above the predetermined current threshold 1022 as shown by the waveform 1020, and the bleeder current 871 drops from the predetermined magnitude 1034 (e.g., I$_{bleed2}$) to the predetermined magnitude 1036 as shown by the waveform 1030. For example, the predetermined magnitude 1036 is equal to zero. As an example, from time t$_1$ to time t$_2$, the bleeder current 871 is not generated.

According to certain embodiments, at time t$_2$, the rectified voltage 813 (e.g., VIN) becomes smaller than the forward bias voltage (e.g., VO) of the one or more LEDs 820 as shown by the waveform 1010, the detected output current 821 (e.g., I$_{led}$) falls below the predetermined current threshold 1022 as shown by the waveform 1020, and the bleeder current 871 is generated at the predetermined magnitude 1032 without any predetermined delay as shown by the waveform 1030. For example, the predetermined magnitude 1032 (e.g., I$_{bleed1}$) is larger than zero. As an example, from time t$_2$ to time t$_3$, the bleeder current 871 remains at the predetermined magnitude 1032 (e.g., I$_{bleed1}$), wherein the time duration from time t$_2$ to time t$_3$ is the predetermined delay T$_{delay}$.

According to some embodiments, at time t$_3$, the bleeder current 871 increases from the predetermined magnitude 1032 to the predetermined magnitude 1034 (e.g., I$_{bleed2}$). For example, the predetermined magnitude 1034 (e.g., I$_{bleed2}$) is larger than the predetermined magnitude 1032. As an example, from time t$_3$ to time t$_4$, the bleeder current 871 remains at the predetermined magnitude 1034 (e.g., I$_{bleed2}$).

In certain embodiments, at time t$_4$, the rectified voltage 813 (e.g., VIN) becomes larger than the forward bias voltage (e.g., VO) of the one or more LEDs 820 as shown by the waveform 1010, the detected output current 821 (e.g., I$_{led}$) rises above the predetermined current threshold 1022 as shown by the waveform 1020, and the bleeder current 871 drops from the predetermined magnitude 1034 (e.g., I$_{bleed2}$) to the predetermined magnitude 1036 as shown by the waveform 1030. For example, the predetermined magnitude 1036 is equal to zero. As an example, at time t$_4$, the bleeder current 871 stops being generated.

In some embodiments, the bleeder current 871 generated at the predetermined magnitude 1032 (e.g., I$_{bleed1}$) is used to prevent the distortion of the rectified voltage 813, and the bleeder current 871 generated at the predetermined magnitude 1034 (e.g., I$_{bleed2}$) is used to ensure that the current flowing through the TRIAC dimmer 810 does not fall below the holding current of the TRIAC dimmer 810. For example, the predetermined magnitude 1032 (e.g., I$_{bleed1}$) is smaller than the predetermined magnitude 1034 (e.g., I$_{bleed2}$), so that the distortion of the rectified voltage 813 is prevented and the energy efficiency of the LED lighting system 800 is not significantly reduce by the bleeder current 871 that is generated during the predetermined delay T$_{delay}$. As an example, the predetermined delay T$_{delay}$ is larger than zero.

As discussed above and further emphasized here. FIG. 8, FIG. 9 and FIG. 10 are merely examples, which should not unduly limit the scope of the claims. One of ordinary skill in the art would recognize many variations, alternatives, and modifications. In certain embodiments, the bleeder current control unit 850 also receives the sensing signal 831 (e.g., LS), determines whether the rectified voltage 813 (e.g., VIN) becomes smaller than the forward bias voltage VO of the one or more LEDs 820, and determines whether the rectified voltage 813 (e.g., VIN) becomes smaller than a threshold voltage that is smaller than the forward bias voltage VO of the one or more LEDs 820. As an example, the threshold voltage is smaller than the forward bias voltage VO of the one or more LEDs 820 and also is larger than but close to zero volts. For example, when the rectified voltage 813 (e.g., VIN) becomes smaller than the forward bias voltage VO of the one or more LEDs 820 (e.g., at time t$_2$ as shown by the waveform 1020 in FIG. 10), immediately the control signal 851 changes from the logic low level to the logic high level so that the switch 876 changes from being open to being closed, and immediately the control signal 853 is generated at a first logic level (e.g., a logic low level) to make the positive terminal (e.g., the "+" terminal) of the amplifier 872 biased to the voltage 884 (e.g., V$_{ref2}$), so that the bleeder current 871 is generated at the predetermined magnitude (e.g., the predetermined magnitude 1032, such as I$_{bleed1}$, as shown by the waveform 1030 in FIG. 10) without any delay. As an example, when the rectified voltage 813 (e.g., VIN) becomes smaller than the threshold voltage, immediately, the control signal 853 changes from the first logic level (e.g., the logic low level) to a second logic level (e.g., the logic high level) to make the positive terminal (e.g., the "+" terminal) of the amplifier 872 biased to the voltage 886 (e.g., V$_{ref3}$), so that the bleeder current 871 increases from the predetermined magnitude to another predetermined magnitude (e.g., at time t$_3$, increases from the predetermined magnitude 1032 to the predetermined magnitude 1034, such as I$_{bleed2}$, as shown by the waveform 1030 in FIG. 10). For example, time t$_3$ follows time t$_2$ by the time duration T$_{delay}$.

Certain embodiments of the present invention provide systems and methods for dimming control associated with LED lighting. For example, the systems and methods for dimming control can prevent distortion of a rectified voltage (e.g., VIN) caused by an insufficient bleeder current. As an example, the system and the method for dimming control can prevent reduction of a range of adjustment for brightness of one or more LEDs, so that users of the one or more LEDs can enjoy improved visual experiences.

According to some embodiments, a system for controlling one or more light emitting diodes includes: a voltage detector configured to receive a rectified voltage associated with a TRIAC dimmer and generated by a rectifying bridge and generate a first sensing signal representing the rectified voltage; a distortion detector configured to receive the first sensing signal, determine whether the rectified voltage is distorted or not based at least in part on the first sensing signal, and generate a distortion detection signal indicating whether the rectified voltage is distorted or not; a phase detector configured to receive the first sensing signal and generate a phase detection signal indicating a detected phase range within which the TRIAC dimmer is in a conduction state based at least in part on the first sensing signal; a voltage generator configured to receive the phase detection signal from the phase detector, receive the distortion detection signal from the distortion detector, and generate a reference voltage based at least in part on the phase detection signal and the distortion detection signal; a current regulator configured to receive the reference voltage from the voltage generator, receive a diode current flowing through the one or more light emitting diodes, and generate a second sensing signal representing the diode current; a bleeder controller configured to receive the second sensing signal from the current regulator and generate a bleeder control signal based at least in part on the second sensing signal, the bleeder control signal indicating whether a bleeder current is allowed or not allowed to be generated; and a bleeder configured to receive the bleeder control signal from the bleeder controller and generate a bleeder current based at least in part on the bleeder control signal; wherein the voltage generator is further configured to, if the distortion detection signal indicates that the rectified voltage is distorted: perform a phase compensation to the detected phase range within which the TRIAC dimmer is in the conduction state to generate a compensated phase range; and use the compensated phase range to generate the reference voltage. For example, the system for controlling one or more light emitting diodes is implemented according to FIG. 4, FIG. 5, FIG. 6, and/or FIG. 7.

In some examples, the voltage generator is further configured to, if the distortion detection signal indicates that the rectified voltage is not distorted, use the detected phase range to generate the reference voltage. In certain examples, the voltage generator is further configured to, if the distortion detection signal indicates that the rectified voltage is distorted, generate the compensated phase range by adding a predetermined phase to the detected phase range; wherein: the compensated phase range is equal to a sum of the detected phase range and the predetermined phase; and the predetermined phase is larger than zero.

In some examples, the bleeder controller is further configured to, if the second sensing signal changes from being larger than a predetermined threshold to being smaller than the predetermined threshold, after a predetermined delay of time, change the bleeder control signal from indicating the bleeder current is not allowed to be generated to indicating the bleeder current is allowed to be generated; wherein the predetermined delay of time is larger than zero. In certain examples, the bleeder controller is further configured to, if the second sensing signal changes from being smaller than the predetermined threshold to being larger than the predetermined threshold, immediately, change the bleeder control signal from indicating the bleeder current is allowed to be generated to indicating the bleeder current is not allowed to be generated.

In some examples, the distortion detector is further configured to, if the TRIAC dimmer is a leading-edge TRIAC dimmer: determine a downward slope of a falling edge of the rectified voltage based at least in part on the first sensing signal; compare the downward slope and a predetermined slope; and if the downward slope is larger than the predetermined slope in magnitude, determine that the rectified voltage is distorted. In certain examples, the distortion detector is further configured to, if the TRIAC dimmer is the leading-edge TRIAC dimmer: if the downward slope is not larger than the predetermined slope in magnitude, determine that the rectified voltage is not distorted.

According to certain embodiments, a system for controlling one or more light emitting diodes, the system comprising: a voltage detector configured to receive a rectified voltage associated with a TRIAC dimmer and generated by a rectifying bridge and generate a first sensing signal representing the rectified voltage; a distortion detector configured to receive the first sensing signal, determine whether the rectified voltage is distorted or not based at least in part on the first sensing signal, and generate a distortion detection signal indicating whether the rectified voltage is distorted or not; a phase detection and voltage generator configured to receive the first sensing signal, detect a phase range within which the TRIAC dimmer is in a conduction state based at least in part on the first sensing signal, and generate a reference voltage based at least in part on the detected phase range; a current regulator configured to receive the reference voltage from the phase detection and voltage generator, receive a diode current flowing through the one or more light emitting diodes, and generate a second sensing signal representing the diode current; a bleeder controller configured to receive the second sensing signal from the current regulator, receive the distortion detection signal from the distortion detector, and generate a first bleeder control signal and a second bleeder control signal based at least in part on the second sensing signal and the distortion detection signal, the first bleeder control signal indicating whether a bleeder current is allowed or not allowed to be generated; and a bleeder configured to receive the first bleeder control signal and the second bleeder control signal from the bleeder controller and generate the bleeder current based at least in part on the first bleeder control signal and the second bleeder control signal; wherein the bleeder controller is further configured to, if the distortion detection signal indicates that the rectified voltage is distorted and if the second sensing signal changes from being larger than a predetermined threshold to being smaller than the predetermined threshold: immediately change the first bleeder control signal from indicating the bleeder current is not allowed to be generated to indicating the bleeder current is allowed to be generated; immediately generate the second bleeder control signal at a first logic level; and after a predetermined delay of time, change the second bleeder control signal from the first logic level to a second logic level, the predetermined delay of time being larger than zero; wherein the bleeder is further configured to, if the first bleeder control signal changes from indicating the bleeder current is not allowed to be generated to indicating the bleeder current is allowed to be generated: generate the bleeder current at a first current magnitude if the second bleeder control signal is at the first logic level; and generate the bleeder current at a second current magnitude if the second bleeder control signal is at the second logic level; wherein the first current magnitude is smaller than the second current magnitude. For example, the system for controlling one or more light emitting diodes is implemented according to FIG. 8, FIG. 9, and/or FIG. 10.

In certain examples, the bleeder controller is further configured to, if the distortion detection signal indicates that the rectified voltage is not distorted and if the second sensing signal changes from being larger than the predetermined threshold to being smaller than the predetermined threshold, after the predetermined delay of time, change the first bleeder control signal from indicating the bleeder current is not allowed to be generated to indicating the bleeder current is allowed to be generated and also generate the second bleeder control signal at the second logic level. In some examples, the bleeder controller is further configured to, if the second sensing signal changes from being smaller than the predetermined threshold to being larger than the predetermined threshold, immediately, change the first bleeder control signal from indicating the bleeder current is allowed to be generated to indicating the bleeder current is not allowed to be generated.

In certain examples, the distortion detector is further configured to, if the TRIAC dimmer is a leading-edge TRIAC dimmer: determine a downward slope of a falling edge of the rectified voltage based at least in part on the first sensing signal; compare the downward slope and a predetermined slope; and if the downward slope is larger than the predetermined slope in magnitude, determine that the rectified voltage is distorted. In some examples, the distortion detector is further configured to, if the TRIAC dimmer is the leading-edge TRIAC dimmer: if the downward slope is not larger than the predetermined slope in magnitude, determine that the rectified voltage is not distorted. In certain examples, the first logic level is a logic low level; and the second logic level is a logic high level.

According to some embodiments, a method for controlling one or more light emitting diodes includes: receiving a rectified voltage associated with a TRIAC dimmer; generating a first sensing signal representing the rectified voltage; receiving the first sensing signal; determining whether the rectified voltage is distorted or not based at least in part on the first sensing signal; generating a distortion detection signal indicating whether the rectified voltage is distorted or not; generating a phase detection signal indicating a detected phase range within which the TRIAC dimmer is in a conduction state based at least in part on the first sensing signal; receiving the phase detection signal and the distortion detection signal; generating a reference voltage based at least in part on the phase detection signal and the distortion detection signal; receiving the reference voltage and a diode current flowing through the one or more light emitting diodes; generating a second sensing signal representing the diode current; receiving the second sensing signal; generating a bleeder control signal based at least in part on the second sensing signal, the bleeder control signal indicating whether a bleeder current is allowed or not allowed to be generated; receiving the bleeder control signal; and generating a bleeder current based at least in part on the bleeder control signal; wherein the generating a reference voltage based at least in part on the phase detection signal and the distortion detection signal includes, if the distortion detection signal indicates that the rectified voltage is distorted: performing a phase compensation to the detected phase range within which the TRIAC dimmer is in the conduction state to generate a compensated phase range; and using the compensated phase range to generate the reference voltage. For example, the method for controlling one or more light emitting diodes is implemented according to FIG. 4, FIG. 5, FIG. 6, and/or FIG. 7.

In some examples, the generating a reference voltage based at least in part on the phase detection signal and the distortion detection signal further includes, if the distortion detection signal indicates that the rectified voltage is not distorted, using the detected phase range to generate the reference voltage. In certain examples, the performing a phase compensation to the detected phase range within which the TRIAC dimmer is in the conduction state to generate a compensated phase range includes: generating the compensated phase range by adding a predetermined phase to the detected phase range; wherein: the compensated phase range is equal to a sum of the detected phase range and the predetermined phase; and the predetermined phase is larger than zero.

In some examples, the generating a bleeder control signal based at least in part on the second sensing signal includes: if the second sensing signal changes from being larger than a predetermined threshold to being smaller than the predetermined threshold, after a predetermined delay of time, changing the bleeder control signal from indicating the bleeder current is not allowed to be generated to indicating the bleeder current is allowed to be generated; wherein the predetermined delay of time is larger than zero. In certain examples, the generating a bleeder control signal based at least in part on the second sensing signal further includes: if the second sensing signal changes from being smaller than the predetermined threshold to being larger than the predetermined threshold, immediately, changing the bleeder control signal from indicating the bleeder current is allowed to be generated to indicating the bleeder current is not allowed to be generated.

In some examples, the determining whether the rectified voltage is distorted or not based at least in part on the first sensing signal includes, if the TRIAC dimmer is a leading-edge TRIAC dimmer: determining a downward slope of a falling edge of the rectified voltage based at least in part on the first sensing signal; comparing the downward slope and a predetermined slope; and if the downward slope is larger than the predetermined slope in magnitude, determining that the rectified voltage is distorted. In certain examples, the determining whether the rectified voltage is distorted or not based at least in part on the first sensing signal further includes, if the TRIAC dimmer is the leading-edge TRIAC dimmer: if the downward slope is not larger than the predetermined slope in magnitude, determining that the rectified voltage is not distorted.

According to certain embodiments, a method for controlling one or more light emitting diodes includes: receiving a rectified voltage associated with a TRIAC dimmer; generating a first sensing signal representing the rectified voltage; receiving the first sensing signal; determining whether the rectified voltage is distorted or not based at least in part on the first sensing signal; generating a distortion detection signal indicating whether the rectified voltage is distorted or not; detecting a phase range within which the TRIAC dimmer is in a conduction state based at least in part on the first sensing signal; generating a reference voltage based at least in part on the detected phase range; receiving the reference voltage and a diode current flowing through the one or more light emitting diodes; generating a second sensing signal representing the diode current; receiving the second sensing signal and the distortion detection signal; generating a first bleeder control signal and a second bleeder control signal based at least in part on the second sensing signal and the distortion detection signal, the first bleeder control signal indicating whether a bleeder current is allowed or not allowed to be generated; receiving the first bleeder control signal and the second bleeder control signal; and generating the bleeder current based at least in part on the first bleeder control signal and the second bleeder control signal; wherein the generating a first bleeder control signal and a second bleeder control signal based at least in part on the second sensing signal and the distortion detection signal includes, if the distortion detection signal indicates that the rectified voltage is distorted and if the second sensing signal changes from being larger than a predetermined threshold to being smaller than the predetermined threshold: immediately changing the first bleeder control signal from indicating the bleeder current is not allowed to be generated to indicating the bleeder current is allowed to be generated; immediately generating the second bleeder control signal at a first logic level; and after a predetermined delay of time, changing the second bleeder control signal from the first logic level to a second logic level, the predetermined delay of time being larger than zero; wherein the generating the bleeder current based at least in part on the first bleeder control signal and the second bleeder control signal includes, if the first bleeder control signal changes from indicating the bleeder current is not allowed to be generated to indicating the bleeder current is allowed to be generated: generating the bleeder current at a first current magnitude if the second bleeder control signal is at the first logic level; and generating the bleeder current at a second current magnitude if the second bleeder control signal is at the second logic level; wherein the first current magnitude is smaller than the second current magnitude. For example, the method for controlling one or more light emitting diodes is implemented according to FIG. 8, FIG. 9, and/or FIG. 10.

In certain examples, the generating a first bleeder control signal and a second bleeder control signal based at least in part on the second sensing signal and the distortion detection signal includes, if the distortion detection signal indicates that the rectified voltage is not distorted and if the second sensing signal changes from being larger than the predetermined threshold to being smaller than the predetermined threshold, after the predetermined delay of time, changing the first bleeder control signal from indicating the bleeder current is not allowed to be generated to indicating the bleeder current is allowed to be generated and also generating the second bleeder control signal at the second logic level. In some examples, the generating a first bleeder control signal and a second bleeder control signal based at least in part on the second sensing signal and the distortion detection signal further includes, if the second sensing signal changes from being smaller than the predetermined threshold to being larger than the predetermined threshold, immediately, changing the first bleeder control signal from indicating the bleeder current is allowed to be generated to indicating the bleeder current is not allowed to be generated.

In certain examples, the determining whether the rectified voltage is distorted or not based at least in part on the first sensing signal includes, if the TRIAC dimmer is a leading-edge TRIAC dimmer: determining a downward slope of a falling edge of the rectified voltage based at least in part on the first sensing signal; comparing the downward slope and a predetermined slope; and if the downward slope is larger than the predetermined slope in magnitude, determining that the rectified voltage is distorted. In some examples, the determining whether the rectified voltage is distorted or not based at least in part on the first sensing signal includes, if the TRIAC dimmer is the leading-edge TRIAC dimmer: if the downward slope is not larger than the predetermined slope in magnitude, determining that the rectified voltage is not distorted. In certain examples, the first logic level is a logic low level; and the second logic level is a logic high level.

For example, some or all components of various embodiments of the present invention each are, individually and/or in combination with at least another component, implemented using one or more software components, one or more hardware components, and/or one or more combinations of software and hardware components. As an example, some or all components of various embodiments of the present invention each are, individually and/or in combination with at least another component, implemented in one or more circuits, such as one or more analog circuits and/or one or more digital circuits. For example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A system for controlling one or more light emitting diodes, the system comprising:
   a voltage detector configured to receive a rectified voltage associated with a TRIAC dimmer and generated by a rectifying bridge and generate a first sensing signal representing the rectified voltage;
   a distortion detector configured to receive the first sensing signal, determine whether the rectified voltage is distorted or not based at least in part on the first sensing signal, and generate a distortion detection signal indicating whether the rectified voltage is distorted or not;
   a phase detector configured to receive the first sensing signal and generate a phase detection signal indicating a detected phase range within which the TRIAC dimmer is in a conduction state based at least in part on the first sensing signal;
   a voltage generator configured to receive the phase detection signal from the phase detector, receive the distortion detection signal from the distortion detector, and generate a reference voltage based at least in part on the phase detection signal and the distortion detection signal;
   a current regulator configured to receive the reference voltage from the voltage generator, receive a diode current flowing through the one or more light emitting diodes, and generate a second sensing signal representing the diode current;
   a bleeder controller configured to receive the second sensing signal from the current regulator and generate a bleeder control signal based at least in part on the second sensing signal, the bleeder control signal indicating whether a bleeder current is allowed or not allowed to be generated; and
   a bleeder configured to receive the bleeder control signal from the bleeder controller and generate a bleeder current based at least in part on the bleeder control signal;
   wherein the voltage generator is further configured to, if the distortion detection signal indicates that the rectified voltage is distorted,
      perform a phase compensation to the detected phase range within which the TRIAC dimmer is in the conduction state to generate a compensated phase range; and
      use the compensated phase range to generate the reference voltage.

2. The system of claim 1, wherein the voltage generator is further configured to, if the distortion detection signal indicates that the rectified voltage is not distorted, use the detected phase range to generate the reference voltage.

3. The system of claim 1, wherein:
   the voltage generator is further configured to, if the distortion detection signal indicates that the rectified voltage is distorted, generate the compensated phase range by adding a predetermined phase to the detected phase range;
   wherein:
   the compensated phase range is equal to a sum of the detected phase range and the predetermined phase; and
   the predetermined phase is larger than zero.

4. The system of claim 1, wherein:
   the bleeder controller is further configured to, if the second sensing signal changes from being larger than a predetermined threshold to being smaller than the predetermined threshold, after a predetermined delay of time; change the bleeder control signal from indicating the bleeder current is not allowed to be generated to indicating the bleeder current is allowed to be generated;

wherein the predetermined delay of time is larger than zero.

5. The system of claim 4, wherein:
the bleeder controller is further configured to, if the second sensing signal changes from being smaller than the predetermined threshold to being larger than the predetermined threshold, immediately, change the bleeder control signal from indicating the bleeder current is allowed to be generated to indicating the bleeder current is not allowed to be generated.

6. The system of claim 1, wherein the distortion detector is further configured to, if the TRIAC dimmer is a leading-edge TRIAC dimmer,
determine a downward slope of a falling edge of the rectified voltage based at least in part on the first sensing signal;
compare the downward slope and a predetermined slope; and
if the downward slope is larger than the predetermined slope in magnitude, determine that the rectified voltage is distorted.

7. The system of claim 6, wherein the distortion detector is further configured to, if the TRIAC dimmer is the leading-edge TRIAC dimmer and if the downward slope is not larger than the predetermined slope in magnitude, determine that the rectified voltage is not distorted.

8. A system for controlling one or more light emitting diodes, the system comprising:
a voltage detector configured to receive a rectified voltage associated with a TRIAC dimmer and generated by a rectifying bridge and generate a first sensing signal representing the rectified voltage;
a distortion detector configured to receive the first sensing signal, determine whether the rectified voltage is distorted or not based at least in part on the first sensing signal, and generate a distortion detection signal indicating whether the rectified voltage is distorted or not;
a phase detection and voltage generator configured to receive the first sensing signal, detect a phase range within which the TRIAC dimmer is in a conduction state based at least in part on the first sensing signal, and generate a reference voltage based at least in part on the detected phase range;
a current regulator configured to receive the reference voltage from the phase detection and voltage generator, receive a diode current flowing through the one or more light emitting diodes, and generate a second sensing signal representing the diode current;
a bleeder controller configured to receive the second sensing signal from the current regulator, receive the distortion detection signal from the distortion detector, and generate a first bleeder control signal and a second bleeder control signal based at least in part on the second sensing signal and the distortion detection signal, the first bleeder control signal indicating whether a bleeder current is allowed or not allowed to be generated; and
a bleeder configured to receive the first bleeder control signal and the second bleeder control signal from the bleeder controller and generate the bleeder current based at least in part on the first bleeder control signal and the second bleeder control signal;

wherein the bleeder controller is further configured to, if the distortion detection signal indicates that the rectified voltage is distorted and if the second sensing signal changes from being larger than a predetermined threshold to being smaller than the predetermined threshold,
immediately change the first bleeder control signal from indicating the bleeder current is not allowed to be generated to indicating the bleeder current is allowed to be generated;
immediately generate the second bleeder control signal at a first logic level; and
after a predetermined delay of time, change the second bleeder control signal from the first logic level to a second logic level, the predetermined delay of time being larger than zero;
wherein the bleeder is further configured to, if the first bleeder control signal changes from indicating the bleeder current is not allowed to be generated to indicating the bleeder current is allowed to be generated,
generate the bleeder current at a first current magnitude if the second bleeder control signal is at the first logic level; and
generate the bleeder current at a second current magnitude if the second bleeder control signal is at the second logic level;
wherein the first current magnitude is smaller than the second current magnitude.

9. The system of claim 8, wherein:
the bleeder controller is further configured to, if the distortion detection signal indicates that the rectified voltage is not distorted and if the second sensing signal changes from being larger than the predetermined threshold to being smaller than the predetermined threshold, after the predetermined delay of time, change the first bleeder control signal from indicating the bleeder current is not allowed to be generated to indicating the bleeder current is allowed to be generated and also generate the second bleeder control signal at the second logic level.

10. The system of claim 9, wherein:
the bleeder controller is further configured to, if the second sensing signal changes from being smaller than the predetermined threshold to being larger than the predetermined threshold, immediately, change the first bleeder control signal from indicating the bleeder current is allowed to be generated to indicating the bleeder current is not allowed to be generated.

11. The system of claim 8, wherein the distortion detector is further configured to, if the TRIAC dimmer is a leading-edge TRIAC dimmer,
determine a downward slope of a falling edge of the rectified voltage based at least in part on the first sensing signal;
compare the downward slope and a predetermined slope; and
if the downward slope is larger than the predetermined slope in magnitude, determine that the rectified voltage is distorted.

12. The system of claim 11, wherein the distortion detector is further configured to, if the TRIAC dimmer is the leading-edge TRIAC dimmer and if the downward slope is not larger than the predetermined slope in magnitude, determine that the rectified voltage is not distorted.

13. The system of claim 8, wherein:
the first logic level is a logic low level; and
the second logic level is a logic high level.

14. A method for controlling one or more light emitting diodes, the method comprising:
receiving a rectified voltage associated with a TRIAC dimmer;
generating a first sensing signal representing the rectified voltage;
receiving the first sensing signal;
determining whether the rectified voltage is distorted or not based at least in part on the first sensing signal;
generating a distortion detection signal indicating whether the rectified voltage is distorted or not;
generating a phase detection signal indicating a detected phase range within which the TRIAC dimmer is in a conduction state based at least in part on the first sensing signal;
receiving the phase detection signal and the distortion detection signal;
generating a reference voltage based at least in part on the phase detection signal and the distortion detection signal;
receiving the reference voltage and a diode current flowing through the one or more light emitting diodes;
generating a second sensing signal representing the diode current;
receiving the second sensing signal;
generating a bleeder control signal based at least in part on the second sensing signal, the bleeder control signal indicating whether a bleeder current is allowed or not allowed to be generated;
receiving the bleeder control signal; and
generating a bleeder current based at least in part on the bleeder control signal;
wherein the generating a reference voltage based at least in part on the phase detection signal and the distortion detection signal includes, if the distortion detection signal indicates that the rectified voltage is distorted,
performing a phase compensation to the detected phase range within which the TRIAC dimmer is in the conduction state to generate a compensated phase range; and
using the compensated phase range to generate the reference voltage.

15. The method of claim 14, wherein the generating a reference voltage based at least in part on the phase detection signal and the distortion detection signal further includes, if the distortion detection signal indicates that the rectified voltage is not distorted, using the detected phase range to generate the reference voltage.

16. The method of claim 14, wherein the performing a phase compensation to the detected phase range within which the TRIAC dimmer is in the conduction state to generate a compensated phase range includes:
generating the compensated phase range by adding a predetermined phase to the detected phase range;
wherein:
the compensated phase range is equal to a sum of the detected phase range and the predetermined phase; and
the predetermined phase is larger than zero.

17. The method of claim 14, wherein the generating a bleeder control signal based at least in part on the second sensing signal includes:
if the second sensing signal changes from being larger than a predetermined threshold to being smaller than the predetermined threshold, after a predetermined delay of time, changing the bleeder control signal from indicating the bleeder current is not allowed to be generated to indicating the bleeder current is allowed to be generated;
wherein the predetermined delay of time is larger than zero.

18. The method of claim 17, wherein the generating a bleeder control signal based at least in part on the second sensing signal further includes:
if the second sensing signal changes from being smaller than the predetermined threshold to being larger than the predetermined threshold, immediately, changing the bleeder control signal from indicating the bleeder current is allowed to be generated to indicating the bleeder current is not allowed to be generated.

19. The method of claim 14, wherein the determining whether the rectified voltage is distorted or not based at least in part on the first sensing signal includes, if the TRIAC dimmer is a leading-edge TRIAC dimmer:
determining a downward slope of a falling edge of the rectified voltage based at least in part on the first sensing signal;
comparing the downward slope and a predetermined slope; and
if the downward slope is larger than the predetermined slope in magnitude, determining that the rectified voltage is distorted.

20. The method of claim 19, wherein the determining whether the rectified voltage is distorted or not based at least in part on the first sensing signal further includes, if the TRIAC dimmer is the leading-edge TRIAC dimmer and if the downward slope is not larger than the predetermined slope in magnitude, determining that the rectified voltage is not distorted.

21. A method for controlling one or more light emitting diodes, the method comprising:
receiving a rectified voltage associated with a TRIAC dimmer;
generating a first sensing signal representing the rectified voltage;
receiving the first sensing signal;
determining whether the rectified voltage is distorted or not based at least in part on the first sensing signal;
generating a distortion detection signal indicating whether the rectified voltage is distorted or not;
detecting a phase range within which the TRIAC dimmer is in a conduction state based at least in part on the first sensing signal;
generating a reference voltage based at least in part on the detected phase range;
receiving the reference voltage and a diode current flowing through the one or more light emitting diodes;
generating a second sensing signal representing the diode current;
receiving the second sensing signal and the distortion detection signal;
generating a first bleeder control signal and a second bleeder control signal based at least in part on the second sensing signal and the distortion detection signal, the first bleeder control signal indicating whether a bleeder current is allowed or not allowed to be generated;
receiving the first bleeder control signal and the second bleeder control signal; and
generating the bleeder current based at least in part on the first bleeder control signal and the second bleeder control signal;

wherein the generating a first bleeder control signal and a second bleeder control signal based at least in part on the second sensing signal and the distortion detection signal includes, if the distortion detection signal indicates that the rectified voltage is distorted and if the second sensing signal changes from being larger than a predetermined threshold to being smaller than the predetermined threshold,
- immediately changing the first bleeder control signal from indicating the bleeder current is not allowed to be generated to indicating the bleeder current is allowed to be generated;
- immediately generating the second bleeder control signal at a first logic level; and
- after a predetermined delay of time, changing the second bleeder control signal from the first logic level to a second logic level, the predetermined delay of time being larger than zero;

wherein the generating the bleeder current based at least in part on the first bleeder control signal and the second bleeder control signal includes, if the first bleeder control signal changes from indicating the bleeder current is not allowed to be generated to indicating the bleeder current is allowed to be generated,
- generating the bleeder current at a first current magnitude if the second bleeder control signal is at the first logic level; and
- generating the bleeder current at a second current magnitude if the second bleeder control signal is at the second logic level;

wherein the first current magnitude is smaller than the second current magnitude.

22. The method of claim 21, wherein:
the generating a first bleeder control signal and a second bleeder control signal based at least in part on the second sensing signal and the distortion detection signal includes, if the distortion detection signal indicates that the rectified voltage is not distorted and if the second sensing signal changes from being larger than the predetermined threshold to being smaller than the predetermined threshold, after the predetermined delay of time, changing the first bleeder control signal from indicating the bleeder current is not allowed to be generated to indicating the bleeder current is allowed to be generated and also generating the second bleeder control signal at the second logic level.

23. The method of claim 22, wherein:
the generating a first bleeder control signal and a second bleeder control signal based at least in part on the second sensing signal and the distortion detection signal further includes, if the second sensing signal changes from being smaller than the predetermined threshold to being larger than the predetermined threshold, immediately, changing the first bleeder control signal from indicating the bleeder current is allowed to be generated to indicating the bleeder current is not allowed to be generated.

24. The method of claim 21, wherein the determining whether the rectified voltage is distorted or not based at least in part on the first sensing signal includes, if the TRIAC dimmer is a leading-edge TRIAC dimmer,
- determining a downward slope of a falling edge of the rectified voltage based at least in part on the first sensing signal;
- comparing the downward slope and a predetermined slope; and
- if the downward slope is larger than the predetermined slope in magnitude, determining that the rectified voltage is distorted.

25. The method of claim 24, wherein the determining whether the rectified voltage is distorted or not based at least in part on the first sensing signal includes, if the TRIAC dimmer is the leading-edge TRIAC dimmer and if the downward slope is not larger than the predetermined slope in magnitude, determining that the rectified voltage is not distorted.

26. The method of claim 21, wherein:
the first logic level is a logic low level; and
the second logic level is a logic high level.

* * * * *